US011376815B2

(12) United States Patent
Colaianna et al.

(10) Patent No.: US 11,376,815 B2
(45) Date of Patent: Jul. 5, 2022

(54) MULTILAYER ASSEMBLY

(71) Applicant: SOLVAY SPECIALTY POLYMERS ITALY S.P.A., Bollate (IT)

(72) Inventors: Pasqua Colaianna, Milan (IT); Amelia Mennella, Torre del Greco (IT); Serena Carella, Parabiago (IT); Marco Colladon, Treviso (IT); Stephen Edmondson, Wiltshire (GB)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 243 days.

(21) Appl. No.: 16/062,892

(22) PCT Filed: Dec. 5, 2016

(86) PCT No.: PCT/EP2016/079762
§ 371 (c)(1),
(2) Date: Jun. 15, 2018

(87) PCT Pub. No.: WO2017/102405
PCT Pub. Date: Jun. 22, 2017

(65) Prior Publication Data
US 2018/0370191 A1 Dec. 27, 2018

(30) Foreign Application Priority Data
Dec. 16, 2015 (EP) .................................. 15200353

(51) Int. Cl.
| *B32B 15/085* | (2006.01) |
| *B32B 1/08* | (2006.01) |
| *C09D 127/18* | (2006.01) |
| *C09D 137/00* | (2006.01) |
| *C09D 5/08* | (2006.01) |
| *B32B 15/00* | (2006.01) |
| *C09D 139/04* | (2006.01) |
| *B32B 15/18* | (2006.01) |
| *B32B 27/20* | (2006.01) |
| *B32B 27/32* | (2006.01) |
| *C08K 5/357* | (2006.01) |
| *B05D 7/00* | (2006.01) |
| *B05D 5/08* | (2006.01) |
| *C08G 73/14* | (2006.01) |
| *C08L 79/08* | (2006.01) |

(52) U.S. Cl.
CPC .............. *B32B 15/085* (2013.01); *B32B 1/08* (2013.01); *B32B 15/00* (2013.01); *B32B 15/18* (2013.01); *B32B 27/20* (2013.01); *B32B 27/322* (2013.01); *C08K 5/357* (2013.01); *C09D 5/08* (2013.01); *C09D 127/18* (2013.01); *C09D 137/00* (2013.01); *C09D 139/04* (2013.01); *B05D 5/083* (2013.01); *B05D 7/52* (2013.01); *B05D 2202/10* (2013.01); *B05D 2254/00* (2013.01); *B32B 2255/06* (2013.01); *B32B 2255/26* (2013.01); *B32B 2255/28* (2013.01); *B32B 2597/00* (2013.01); *C08G 73/14* (2013.01); *C08L 79/08* (2013.01); *Y10T 428/13* (2015.01); *Y10T 428/1359* (2015.01)

(58) Field of Classification Search
CPC ..... C08L 79/04; C09D 179/04; C09D 237/18; C09J 179/04; B32B 2597/00; B32B 15/085; B32B 1/08; B32B 15/18; B32B 27/20; B32B 27/322; B32B 2255/06; B32B 2255/26; B32B 2255/28; C08K 5/357
USPC .......................... 524/500; 525/417; 428/34.1
See application file for complete search history.

(56) References Cited

U.S. PATENT DOCUMENTS

| 4,029,868 | A | 6/1977 | Carlson |
| 4,864,006 | A | 9/1989 | Giannetti et al. |
| 5,543,516 | A | 8/1996 | Ishida |
| 5,677,404 | A | 10/1997 | Blair |
| 5,688,885 | A | 11/1997 | Blair |
| 5,703,185 | A | 12/1997 | Blair |
| 6,773,815 | B2 | 8/2004 | Amouroux |
| 2006/0166048 | A1* | 7/2006 | Sakaguchi .............. C08L 71/12 429/483 |
| 2008/0081195 | A1* | 4/2008 | Chung ........................ C08J 3/28 428/421 |
| 2011/0166025 | A1 | 7/2011 | Jentzer et al. |
| 2013/0209812 | A1 | 8/2013 | Gorodisher et al. |
| 2013/0237722 | A1 | 9/2013 | Vidal et al. |
| 2015/0031819 | A1* | 1/2015 | Rungta .................. C09J 179/04 524/500 |

FOREIGN PATENT DOCUMENTS

| CN | 101516922 A | | 8/2009 |
| CN | 104583306 A | | 4/2015 |
| EP | 0789039 | * | 8/1997 |
| FR | 2797936 A1 | | 3/2001 |
| WO | 2006045630 A2 | | 5/2006 |
| WO | 2008034814 A2 | | 3/2008 |
| WO | 2009092795 A1 | | 7/2009 |

(Continued)

OTHER PUBLICATIONS

Alger, Mark S.M., "Polymer Science Dictionary", 1989, London School of Polymer Technology, Polytechnic of Morth London, UK published by Elsevier Applied Science, p. 476.

(Continued)

*Primary Examiner* — Michael C Miggins
(74) *Attorney, Agent, or Firm* — Osha Bergman Watanabe & Burton LLP

(57) ABSTRACT

The present invention pertains to a multilayer assembly, to a process for the manufacture of said multilayer assembly, to a pipe comprising said multilayer assembly and to uses of said pipe in various applications.

13 Claims, No Drawings

(56) References Cited

FOREIGN PATENT DOCUMENTS

| WO | 2011154661 A1 | 12/2011 |
| WO | 2013000735 A1 | 1/2013 |
| WO | 2014001100 A1 | 1/2014 |

OTHER PUBLICATIONS

Pianca M. et al., "End groups in fluoropolymers", Journal of Fluorine Chemistry, 1999, vol. 95, pp. 71-84—Elsevier Science SA.
Office Action issued in corresponding Chinese Application No. 201680082042.1; dated Aug. 10, 2021 (17 pages).

* cited by examiner

MULTILAYER ASSEMBLY

This application is a U.S. national stage entry under 35 U.S.C. § 371 of International Application No. PCT/EP2016/079762 filed Dec. 5, 2016, which claims priority to European application No. 15200353.9 filed on Dec. 16, 2015. The entire contents of these applications are explicitly incorporated herein by this reference.

TECHNICAL FIELD

The present invention pertains to a multilayer assembly, to a process for the manufacture of said multilayer assembly, to a pipe comprising said multilayer assembly and to uses of said pipe in various applications.

BACKGROUND ART

Off-shore pipelines, used to pump oil and gas ashore from off-shore drilling rigs and terminals, are required to be capable of withstanding very high internal pressures and temperatures and are therefore typically made of metals such as iron and steel.

However, among major issues encountered with metal pipelines in general, and on-shore and off-shore pipelines in particular, is the problem of corrosion due to the severe environment, which causes a deterioration of the material and, as a consequence, reduces its thermal and chemical resistance.

Tetrafluoroethylene/perfluoroalkylvinylether copolymers are melt-processable polymers characterized by a high melting point, high thermal stability, chemical inertness and low dielectric constant, as well as good mechanical properties at high temperatures. Generally, commercial tetrafluoroethylene/perfluoroalkylvinylether copolymers have a melting point of approximately 305° C. and a continuous use temperature of about 260° C., wherein the parameter of continuous use temperature indicates the highest operating temperature that the polymer can continuously withstand.

Therefore, these tetrafluoroethylene/perfluoroalkylvinylether copolymers are widely used as coatings in industrial applications that require a high operating temperature and possibly a chemically aggressive environment, such as coatings of off-shore pipelines. Tetrafluoroethylene/perfluoroalkylvinylether copolymers provide anti-stick properties and thermal and chemical resistance, reducing the access of water, oxygen and carbon dioxide to the metal, thus making negligible the corrosion rate.

However, due to their anti-stick properties, tetrafluoroethylene/perfluoroalkylvinylether copolymers show low adhesion to metal substrates. Thus, to achieve a good adhesion between these tetrafluoroethylene/perfluoroalkylvinylether copolymer coatings and the underlying metal substrate, a primer is usually required.

However, despite the use of a primer, harsh conditions of high temperature and/or pressure, which coated metal pipelines are subjected to, in particular in the oil and gas industry, adversely affect the adhesion of the coating to the metal substrate. Disbondment is typically caused by permeation of moisture or oxygen through a top coat layer. As a consequence, the primer becomes brittle and detachment of the coating from the metal substrate can be observed, resulting in an increased corrosion of the same.

SUMMARY OF INVENTION

It has been now surprisingly found that the multilayer assembly of the invention advantageously withstand severe environment conditions and successfully exhibits outstanding interlayer adhesion properties, while maintaining good anti-corrosion properties and good thermal insulation properties.

In a first instance, the present invention pertains to a multilayer assembly comprising:
  a metal substrate, said metal substrate having an inner surface and an outer surface,
  a layer [layer (L1)] consisting of a composition [composition (C1)] comprising at least one fluoropolymer [polymer (F)], at least one benzoxazine compound [compound (B)] and at least one aromatic polymer [polymer (P)],
  said layer (L1) having a first surface and a second surface, wherein the first surface of said layer (L1) is at least partially adhered to at least one of the inner surface and the outer surface of said metal substrate, and
  a layer [layer (L2)] consisting of a composition [composition (C2)] comprising at least one functional fluoropolymer [functional polymer (F)], said layer (L2) having a first surface and a second surface, wherein the first surface of said layer (L2) is at least partially adhered to the second surface of said layer (L1).

The multilayer assembly of the invention typically further comprises a layer [layer (L3)] consisting of a composition [composition (C3)] comprising at least one fluoropolymer [polymer (F)], said polymer (F) being equal to or different from the polymer (F) of the layer (L1), said layer (L3) having a first surface and a second surface, wherein the first surface of said layer (L3) is at least partially adhered to the second surface of said layer (L2).

The nature of the metal substrate is not particularly limited.

The metal substrate is typically made of stainless steel or carbon steel.

The composition (C1) typically comprises:
at least one fluoropolymer [polymer (F)];
at least one benzoxazine compound [compound (B)] of formula (I):

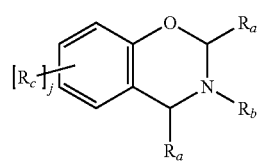

Formula (I)

wherein each of $R_a$, equal or different at each occurrence, is H or a $C_1$-$C_{12}$ alkyl group; $R_b$ is a $C_1$-$C_{36}$ hydrocarbon group, optionally comprising one or more heteroatoms, optionally comprising at least one benzoxazine group; j is zero or an integer of 1 to 4; each of $R_c$, equal or different at each occurrence, is a halogen atom or a $C_1$-$C_{36}$ hydrocarbon group, optionally comprising one or more heteroatoms, optionally comprising at least one benzoxazine group, and
  at least one aromatic polymer [polymer (P)].

The polymer (F) is preferably a "melt-processible" polymer. For the purpose of the present invention, by the term "melt-processible" is meant that the polymer (F) can be processed (i.e. fabricated into shaped articles such as films, fibers, tubes, fittings, wire coatings and the like) by conventional melt extruding, injecting or casting means. This generally requires that the melt viscosity at the processing temperature be no more than $10^8$ Paxsec, preferably from 10 to $10^6$ Paxsec.

The melt viscosity of the polymer (F) can be measured according to ASTM D 1238, using a cylinder, orifice and piston tip made of a corrosion-resistant alloy, charging a sample into the 9.5 mm inside diameter cylinder which is maintained at a temperature exceeding melting point, extruding the sample through a 2.10 mm diameter, 8.00 mm long square-edged orifice under a load (piston plus weight) of 5 Kg. Melt viscosity is calculated in Pa×sec from the observable extrusion rate in grams per minute.

Also, the polymer (F) typically has a dynamic viscosity at a shear rate of 1 rad×sec$^{-1}$ and at a temperature exceeding melting point of about 30° C., preferably at a temperature of $T_{m2}+(30\pm2°\ C.)$ is comprised between 10 and $10^6$ Pa×sec, when measured with a controlled strain rheometer, employing an actuator to apply a deforming strain to the sample and a separate transducer to measure the resultant stress developed within the sample, and using the parallel plate fixture.

The polymer (F) of the invention is a fluoropolymer, i.e. a polymer comprising recurring units derived from at least one fluorinated monomer.

Non limiting examples of suitable fluorinated monomers are notably selected from the group consisting of:

$C_2$-$C_8$ perfluoroolefins, such as tetrafluoroethylene (TFE) and hexafluoropropylene (HFP);

$C_2$-$C_8$ hydrogen-containing fluoroolefins, such as vinyl fluoride, 1,2-difluoroethylene, vinylidene fluoride (VDF), trifluoroethylene (TrFE), pentafluoropropylene and hexafluoroisobutylene;

(per)fluoroalkylethylenes of formula $CH_2=CH=R_{f0}$, wherein $R_{f0}$ is a $C_1$-$C_6$ (per)fluoroalkyl group or a $C_1$-$C_6$ (per)fluorooxyalkyl group comprising one or more ether groups;

chloro- and/or bromo- and/or iodo-$C_2$-$C_6$ fluoroolefins, such as chlorotrifluoroethylene (CTFE);

fluoroalkylvinylethers of formula $CF_2=CFOR_{f1}$, wherein $R_{f1}$ is a $C_1$-$C_6$ fluoro- or perfluoro-alkyl group, e.g. —$CF_3$ (PMVE), —$C_2F_5$ (PEVE), —$C_3F_7$ (PPVE);

hydrofluoroalkylvinylethers of formula $CH_2=CFOR_{f1}$, wherein $R_{f1}$ is a $C_1$-$C_6$ fluoro- or perfluoro-alkyl group, e.g. —$CF_3$, —$C_2F_5$, —$C_3F_7$;

fluoro-oxyalkylvinylethers of formula $CF_2=CFOX_0$, wherein $X_0$ is a $C_1$-$C_{12}$ oxyalkyl group, or a $C_1$-$C_{12}$ (per)fluorooxyalkyl group comprising one or more ether groups, such as perfluoro-2-propoxy-propyl group;

fluoroalkyl-methoxy-vinylethers of formula $CF_2=CFOCF_2OR_{f2}$, wherein $R_{f2}$ is a $C_1$-$C_6$ fluoro- or perfluoro-alkyl group, e.g. —$CF_3$, —$C_2F_5$, —$C_3F_7$ or a $C_1$-$C_6$ (per)fluorooxyalkyl group comprising one or more ether groups, such as —$C_2F_5$—O—$CF_3$;

functional fluoro-alkylvinylethers of formula $CF_2=CFOY_0$, wherein $Y_0$ is a $C_1$-$C_{12}$ alkyl or (per)fluoroalkyl group, or a $C_1$-$C_{12}$ oxyalkyl or a $C_1$-$C_{12}$ (per)fluorooxyalkyl group, said $Y_0$ group comprising a carboxylic group in its acid, acid halide or salt form or a sulfonic group in its acid, acid halide or salt form; and fluorodioxoles of formula:

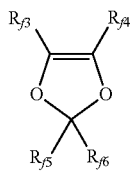

wherein each of $R_{f3}$, $R_{f4}$, $R_{f5}$, $R_{f6}$, equal to or different from each other, is independently a fluorine atom, a $C_1$-$C_6$ fluoro- or per(halo)fluoro-alkyl group, optionally comprising one or more oxygen atoms, e.g. —$CF_3$, —$C_2F_5$, —$C_3F_7$, —$OCF_3$, —$OCF_2CF_2OCF_3$.

Polymers (F) which have been found particularly suitable for the compositions of the multilayer assembly of the invention are per(halo)fluoropolymers [polymers (FH)].

For the purpose of the invention, the term "per(halo) fluoropolymer [polymer (FH)]" is intended to denote a fluoropolymer wherein all the carbon atoms are free of hydrogen atoms.

The polymer (FH) may comprise one or more halogen atoms (Cl, Br, I) different from fluorine.

The term "free of hydrogen atoms" is understood to mean that the per(halo)fluoropolymer consists essentially of recurring units derived from ethylenically unsaturated monomers comprising at least one fluorine atom wherein all the carbon atoms are free of hydrogen atoms [per(halo)fluoromonomer (PFM)].

The polymer (FH) may be a homopolymer of a per(halo) fluoromonomer (PFM) or a copolymer comprising recurring units derived from at least one per(halo)fluoromonomer (PFM).

Non limiting examples of suitable per(halo)fluoromonomers (PFM) are notably selected from the group consisting of:

$C_2$-$C_8$ perfluoroolefins, such as tetrafluoroethylene (TFE) and hexafluoropropylene (HFP);

$C_2$-$C_6$ perhalofluoroolefins comprising at least one halogen atom different from fluorine, e.g. Cl, Br, I, such as notably chlorotrifluoroethylene (CTFE);

per(halo)fluoroalkylvinylethers of formula $CF_2=CFOR_{f1}$, wherein $R_{f1}$ is a $C_1$-$C_6$ per(halo)fluoroalkyl group, optionally comprising one or more than one halogen atoms different from F, e.g. —$CF_3$, —$C_2F_5$, —$C_3F_7$;

per(halo)fluoro-oxyalkylvinylethers of formula $CF_2=CFOX_{01}$, wherein $X_{01}$ is a $C_1$-$C_{12}$ per(halo)fluorooxyalkyl group optionally comprising at least one halogen atom different from fluorine, comprising one or more ether groups, such as, notably, perfluoro-2-propoxy-propyl group;

per(halo)fluoro-methoxy-alkylvinylethers of formula $CF_2=CFOCF_2OR_{f2}$, wherein $R_{f2}$ is a $C_1$-$C_6$ per(halo) fluoroalkyl group, optionally comprising at least one halogen atom different from fluorine, such as —$CF_3$, —$C_2F_5$, —$C_3F_7$ or a $C_1$-$C_6$ per(halo)fluorooxyalkyl group, optionally comprising at least one halogen atom different from fluorine, comprising one or more ether groups, such as —$C_2F_5$—O—$CF_3$;

functional per(halo)fluoro-alkylvinylethers of formula $CF_2=CFOY_0$, wherein $Y_0$ is a $C_1$-$C_{12}$ per(halo)fluoroalkyl group, or a $C_1$-$C_{12}$ per(halo)fluorooxyalkyl group, said $Y_0$ group comprising a carboxylic group in its acid, acid halide or salt form or a sulfonic group in its acid, acid halide or salt form;

per(halo)fluorodioxoles of formula:

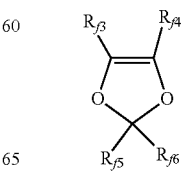

wherein each of $R_{f3}$, $R_{f4}$, $R_{f5}$, $R_{f6}$, equal to or different from each other, is independently a fluorine atom, a $C_1$-$C_6$ per(halo)fluoroalkyl group, optionally comprising one or more oxygen atoms, optionally comprising at least one halogen atom different from fluorine, e.g. —$CF_3$, —$C_2F_5$, —$C_3F_7$, —$OCF_3$, —$OCF_2CF_2OCF_3$; preferably a per(halo)fluorodioxole of formula here above, wherein $R_{f3}$ and $R_{f4}$ are fluorine atoms and $R_{f5}$ and $R_{f6}$ are perfluoromethyl groups (—$CF_3$) [perfluoro-2,2-dimethyl-1,3-dioxole (PDD)], or a per(halo)fluorodioxole of formula here above, wherein $R_{f3}$, $R_{f5}$ and $R_{f6}$ are fluorine atoms and $R_{f4}$ is a perfluoromethoxy group (—$OCF_3$) [2,2,4-trifluoro-5-trifluoromethoxy-1,3-dioxole or perfluoromethoxydioxole (MDO)].

The polymer (FH) is advantageously selected from the group consisting of copolymers of tetrafluoroethylene (TFE) with at least one per(halo)fluoromonomer (PFM) different from TFE.

The TFE copolymer as defined above comprises advantageously at least 0.5% by weight, preferably at least 1.0% by weight, more preferably at least 1.5% by weight, even more preferably at least 4% by weight of recurring units derived from at least one per(halo)fluoromonomer (PFM).

The TFE copolymer as defined above comprises advantageously at most 30% by weight, preferably at most 25% by weight, more preferably at most 20% by weight of recurring units derived from at least one per(halo)fluoromonomer (PFM).

Good results have been obtained with TFE copolymers as defined above comprising at least 1.0% by weight and at most 30% by weight of recurring units derived from at least one per(halo)fluoromonomer (PFM).

Preferred polymers (FH) are selected from the group consisting of TFE copolymers comprising recurring units derived from at least one per(halo)fluoromonomer (PFM) selected from the group consisting of:
1. perfluoroalkylvinylethers of formula $CF_2$=$CFOR_{f1'}$, wherein $R_{f1'}$ is a $C_1$—$C_6$ perfluoroalkyl group, e.g. —$CF_3$, —$C_2F_5$, —$C_3F_7$; and/or
2. perfluoro-oxyalkylvinylethers of general formula $CF_2$=$CFOX_0$, wherein $X_0$ is a $C_1$-$C_{12}$ perfluorooxyalkyl group comprising one or more ether groups, such as perfluoro-2-propoxy-propyl group; and/or
3. $C_3$-$C_8$ perfluoroolefins, such as hexafluoropropene (HFP); and/or
4. perfluorodioxoles of formula:

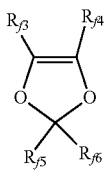

wherein each of $R_{f3}$, $R_{f4}$, $R_{f5}$, $R_{f6}$, equal to or different from each other, is independently a fluorine atom, a $C_1$-$C_6$ perfluoroalkyl group, optionally comprising one or more oxygen atoms, e.g. —$CF_3$, —$C_2F_5$, —$C_3F_7$, —$OCF_3$, —$OCF_2CF_2OCF_3$.

More preferred polymers (FH) are selected from the group consisting of TFE copolymers comprising recurring units derived from at least one per(halo)fluoromonomer (PFM) selected from the group consisting of:
1. perfluoroalkylvinylethers of formula $CF_2$=$CFOR_{f1}$, wherein $R_{f1}$ is a $C_1$-$C_6$ perfluoroalkyl group;
2. perfluoro-oxyalkylvinylethers of formula $CF_2$=$CFOX_{01}$, wherein $X_{01}$ is a $C_1$-$C_{12}$ perfluorooxyalkyl group comprising one or more ether groups;
3. $C_3$-$C_8$ perfluoroolefins; and
4. mixtures thereof.

According to a first embodiment of the invention, the polymer (FH) is selected from the group consisting of TFE copolymers comprising recurring units derived from hexafluoropropylene (HFP) and optionally from at least one per(halo)fluoroalkylvinylether, as defined above, preferably from at least one perfluoroalkylvinylether of formula $CF_2$=$CFOR_{f1'}$, wherein $R_{f1'}$ is a $C_1$-$C_6$ perfluoroalkyl group.

Preferred polymers (FH) according to this first embodiment of the invention are selected from the group consisting of TFE copolymers comprising (preferably consisting essentially of) recurring units derived from tetrafluoroethylene (TFE) and hexafluoropropylene (HFP) in an amount ranging from 3% to 15% by weight and, optionally, from 0.5% to 3% by weight of at least one perfluoroalkylvinylether, as defined above.

The expression "consisting essentially of" is used within the context of the present invention for defining constituents of a polymer to take into account end chains, defects, irregularities and monomer rearrangements which might be comprised in said polymers in minor amounts, without this modifying essential properties of the polymer.

A description of such polymers (F) can be found notably in U.S. Pat. No. 4,029,868 (E. I. DU PONT DE NEMOURS AND COMPANY) 14, Jun. 1977, in U.S. Pat. No. 5,677,404 (E. I. DU PONT DE NEMOURS AND COMPANY) 14, Oct. 1997, in U.S. Pat. No. 5,703,185 (E. I. DU PONT DE NEMOURS AND COMPANY) 30, Dec. 1997 and in U.S. Pat. No. 5,688,885 (E. I. DU PONT DE NEMOURS AND COMPANY) 18, Nov. 1997.

Best results within this embodiment have been obtained with TFE copolymers comprising (preferably consisting essentially of) recurring units derived from tetrafluoroethylene (TFE) and hexafluoropropylene (HFP) in an amount ranging from 4% to 12% by weight and either perfluoroethylvinylether or perfluoropropylvinylether in an amount of from 0.5% to 3% by weight.

According to a second embodiment of the invention, the polymer (FH) is selected from the group consisting of TFE copolymers comprising recurring units derived from at least one per(halo)fluoroalkylvinylether, as defined above, preferably from at least one perfluoroalkylvinylether, as defined above, and optionally further comprising recurring units derived from at least one $C_3$-$C_8$ perfluoroolefin.

Good results within this second embodiment of the invention have been obtained with TFE copolymers comprising recurring units derived from one or more than one perfluoroalkylvinylethers as defined above; particularly good results have been achieved with TFE copolymers wherein the perfluoroalkylvinylether is perfluoromethylvinylether ($CF_2$=$CFOCF_3$), perfluoroethylvinylether ($CF_2$=$CFOC_2F_5$), perfluoropropylvinylether ($CF_2$=$CFOC_3F_7$) and mixtures thereof.

According to a preferred variant of the second embodiment of the invention, the polymer (FH) is advantageously a TFE copolymer consisting essentially of:
(a) from 3% to 13% by weight, preferably from 5% to 12% by weight of recurring units derived from perfluoromethylvinylether;
(b) from 0 to 6% by weight of recurring units derived from one or more than one fluorinated monomers different from perfluoromethylvinylether and selected from the group consisting of perfluoroalkylvinylethers of formula $CF_2=CFOR_{f1'}$, wherein $R_{f1'}$ is a $C_1$-$C_6$ perfluoroalkyl group, and perfluoro-oxyalkylvinylethers of formula $CF_2=CFOX_{01'}$, wherein $X_{01'}$ is a $C_1$-$C_{12}$ perfluorooxyalkyl group comprising one or more ether groups; preferably derived from perfluoroethylvinylether and/or perfluoropropylvinylether;

(c) recurring units derived from tetrafluoroethylene, in such an amount that the sum of the percentages of the recurring units (a), (b) and (c) is equal to 100% by weight.

Polymers (FH) according to this second embodiment of the invention which have been found suitable for use in the composition (C1) are commercially available from Solvay Specialty Polymers Italy S.p.A. under the trademark name of HYFLON® PFA P and M series and HYFLON® MFA.

According to another preferred variant of this second embodiment of the invention, the polymer (FH) is advantageously a TFE copolymer consisting essentially of:

(a') from 0.5% to 13% by weight of recurring units derived from perfluoromethylvinylether;

(b') from 0.4% to 6% by weight of recurring units derived from one or more fluorinated monomers different from perfluoromethylvinylether and selected from the group consisting of perfluoroalkylvinylethers, as defined above, and/or perfluoro-oxyalkylvinylethers, as defined above; preferably derived from perfluoroethylvinylether and/or perfluoropropylvinylether;

(c') from 0.5% to 6% weight of recurring units derived from at least one $C_3$-$C_8$ perfluoroolefin, preferably derived from hexafluoropropylene; and (d') recurring units derived from tetrafluoroethylene in such an amount that the sum of the percentages of the recurring units (a'), (b'), (c') and (d') is equal to 100% by weight.

According to a first embodiment of the invention, the polymer (F) may be a non-functional fluoropolymer [non-functional polymer (F)]. For the purpose of the present invention, the term "non-functional" is intended to denote a fluoropolymer free of polar functional groups.

According to a second embodiment of the invention, the polymer (F) may be a functional fluoropolymer comprising one or more polar functional groups [functional polymer (F)].

The functional polymer (F) typically comprises one or more polar functional groups in an amount of from 8 to 200 mmoles/Kg, preferably from 10 to 100 mmoles/Kg of said functional polymer (F).

The functional polymer (F) is preferably a fluoropolymer comprising one or more polar functional groups selected from the group consisting of carboxylic groups in acid, acid halide or salt form, sulfonic groups in acid, acid halide or salt form, epoxide groups, silyl groups, alkoxysilane groups, hydroxyl groups and isocyanate groups.

The functional polymer (F) is more preferably a fluoropolymer comprising one or more polar functional groups selected from the group consisting of carboxylic groups in acid, acid halide or salt form and sulfonic groups in acid, acid halide or salt form.

Non limiting examples of carboxylic groups in acid halide form include acyl fluoride groups.

The identification and quantitative determination of the polar functional groups in the functional polymer (F) is generally carried out using commonly known techniques such as IR and NMR spectroscopies.

The functional polymer (F) is even more preferably a functional per(halo)fluoropolymer comprising one or more polar functional groups [functional polymer (FH)].

According to a first embodiment of the invention, the functional polymer (F) is typically manufactured by irradiation of at least one polymer (F) as defined above using either a photon source or an electron source such as beta rays, gamma rays or X rays.

Irradiation is advantageously carried out at an irradiation dose of from 0.2 MRad to 50 MRad, preferably from 3 MRad to 40 MRad.

Irradiation is typically carried out under air atmosphere or under vacuum. Alternatively, irradiation may be performed under modified atmosphere, e.g. under an inert gas such as $N_2$.

According to a second embodiment of the invention, the functional polymer (F) is typically manufactured by polymerization of at least one fluorinated monomer such as a per(halo)fluoromonomer (PFM) with at least one functional fluoro-alkylvinylether of formula $CF_2=CFOY_0$, wherein $Y_0$ is a $C_1$-$C_{12}$ alkyl or (per)fluoroalkyl group, or a $C_1$-$C_{12}$ oxyalkyl or a $C_1$-$C_{12}$ (per)fluorooxyalkyl group, said $Y_0$ group comprising a carboxylic group in its acid, acid halide or salt form or a sulfonic group in its acid, acid halide or salt form.

The polymer (F) of the invention is advantageously thermoplastic.

The term "thermoplastic" is understood to mean, for the purposes of the present invention, polymers existing, at room temperature (25° C.), below their melting point if they are semi-crystalline, or below their $T_g$ if they are amorphous. These polymers have the property of becoming soft when they are heated and of becoming rigid again when they are cooled, without there being an appreciable chemical change. Such a definition may be found, for example, in the encyclopaedia called "Polymer Science Dictionary", Mark S. M. Alger, London School of Polymer Technology, Polytechnic of North London, UK, published by Elsevier Applied Science, 1989.

Preferably, the polymer (F) is semi-crystalline. The term "semi-crystalline" is intended to denote a polymer having a heat of fusion of more than 1 J/g when measured by Differential canning calorimetry (DSC) at a heating rate of 10° C./min, according to ASTM D 3418. Preferably, the semi-crystalline polymer (F) of the invention has a heat of fusion of at least 3 J/g, more preferably of at least 5 J/g, most preferably of at least 10 J/g.

The compound (B) is generally manufactured by reaction of a primary amine comprising at least one —$NH_2$ group, a phenol compound comprising at least one phenolic hydroxylic group, and an aliphatic aldehyde, according to the reaction scheme below:

Formula (I)

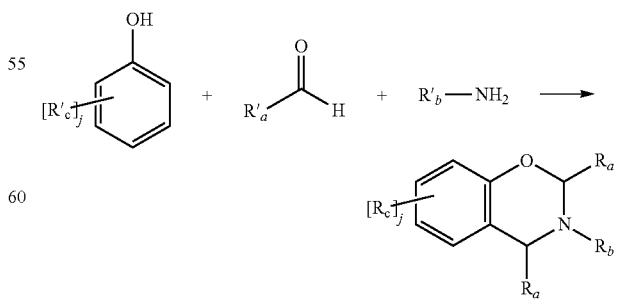

wherein $R'_a$ is H or a $C_1$-$C_{12}$ alkyl group; $R'_b$ is a $C_1$-$C_{36}$ hydrocarbon group, optionally comprising one or more heteroatoms, optionally comprising at least one additional —$NH_2$ group; j is zero or an integer of 1 to 4; each of $R'_c$, equal or different at each occurrence, is a halogen atom or a $C_1$-$C_{36}$ hydrocarbon group, optionally comprising one or more heteroatoms, optionally comprising at least one additional phenol group; and $R_b$ is a $C_1$-$C_{36}$ hydrocarbon group, optionally comprising one or more heteroatoms, optionally comprising at least one benzoxazine group; j is zero or an integer of 1 to 4; each of $R_c$, equal to or different at each occurrence, is a halogen atom or a $C_1$-$C_{36}$ hydrocarbon group, optionally comprising one or more heteroatoms, optionally comprising at least one benzoxazine group; each of $R_a$, equal or different at each occurrence, is H or a $C_1$-$C_{12}$ alkyl group.

The aliphatic aldehyde used in the preparation of the compound (B) include formaldehyde and precursors thereof, including notably paraformaldehyde and polyoxymethylene; and aliphatic aldehydes of formula $R_a$—CHO, wherein $R_a$ is H or a $C_1$-$C_{12}$ alkyl group, which may be advantageously linear or branched, cyclic or acyclic, saturated or unsaturated, or combinations thereof. Useful aldehydes, other than formaldehyde, include notably crotonaldehyde, acetaldehyde, proprionaldehyde, butyraldehyde and heptaldehyde.

The compound (B) can be notably manufactured by the method described in U.S. Pat. No. 5,543,516 (EDISON POLYMER INNOVATION) 6, Aug. 1996, although other methods can be equally conveniently used.

Because the primary amine as defined above may comprise more than one groups —$NH_2$, and/or because the phenol compound may comprise more than one phenolic hydroxylic groups, the resulting compound (B) may comprise more than one benzoxazine groups.

Generally, phenol compounds having two phenolic hydroxylic groups and/or primary amines comprising two groups —$NH_2$ may be advantageously used.

The primary amine maybe an aliphatic amine or an aromatic amine. Useful mono-amines include, for example methyl-, ethyl-, propyl-, hexyl-, octyl-, dodecyl-amine, aniline and substituted derivatives thereof. Representative diamines are notably 4,4'-methylenedianiline, ethylene diamine, 1,3-propane diamine.

Examples of monofunctional phenol compounds include phenol, cresol, 2-bromo-4-methylphenol, 2-allylphenol, 4-aminophenol; examples of difunctional phenol compounds include phenolphthalein, bis-phenol, 4,4'-methylene-di-phenol; 4,4'-dihydroxybenzophenone; bis-phenol A, bis-phenol F, bis-phenol AF.

The compound (B) is preferably of any of formulae (II), (III) and (IV) here below:

Formula (II)

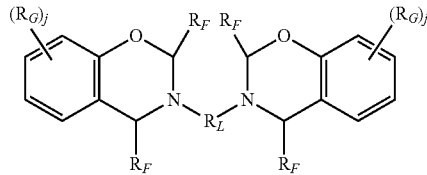

Formula (III)

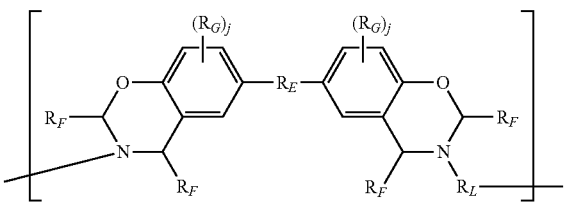

Formula (IV)

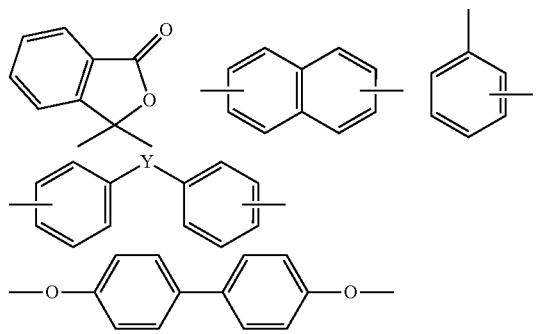

wherein
$R_E$ is a covalent bond or a divalent group selected from the group consisting of —O—, —S—, —$SO_2$—, —$(CH_2)_m$—, wherein m is an integer from 1 to 6, —C(O)—, —$C(CF_3)_2$—, —$(CF_2)_n$—, n being an integer from 1 to 6, and groups of any of formulae:

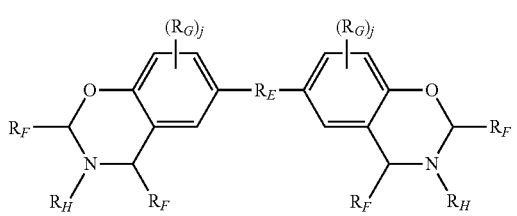

wherein Y is a covalent bond or a divalent group selected from the group consisting of —O—, —S—, —$SO_2$—, —$(CH_2)_m$—, wherein m is an integer from 1 to 6, —C(O)—, —$C(CF_3)_2$—, —$(CF_2)_n$—, n being an integer from 1 to 6;
$R_L$ is a divalent group selected from the group consisting of divalent $C_1$-$C_{12}$ aliphatic groups, linear or branched when possible, or an aromatic group of formula:

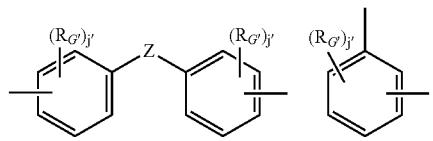

with Z being a covalent bond or a divalent group selected from the group consisting of —O—, —S—, —$SO_2$—, —$(CH_2)_m$—, wherein m is an integer from 1 to 6, —C(O)—, —$C(CF_3)_2$—, —$(CF_2)_n$—, n being an integer from 1 to 6;
j and j', equal to or different from each other at each occurrence, is zero or is an integer of 1 to 3;
each of $R_G$ and $R_{G'}$, equal or different at each occurrence, is a halogen atom or a $C_1$-$C_{36}$ hydrocarbon group, optionally comprising one or more heteroatoms;

each of $R_F$, equal or different at each occurrence, is H or a $C_1$-$C_{12}$ alkyl group;

each of $R_H$ is a $C_1$-$C_{36}$ hydrocarbon group, optionally comprising one or more heteroatoms.

The compound (B) is preferably of formula (II) as defined above. Even more preferably, the compound (B) is selected from the group consisting of compounds (B-1) to (B-5) here below:

Formula (B-1)

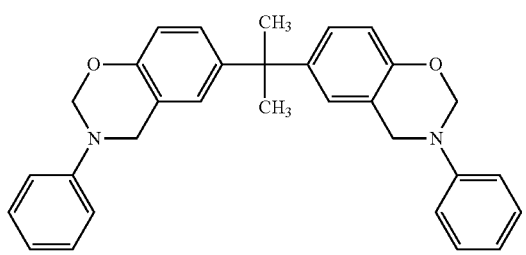

Formula (B-2)

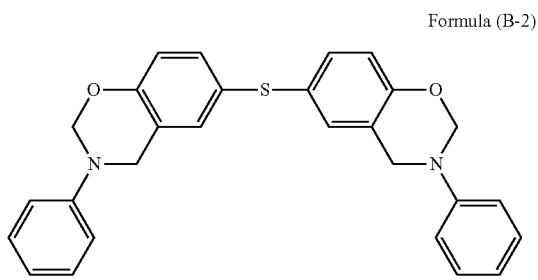

Formula (B-3)

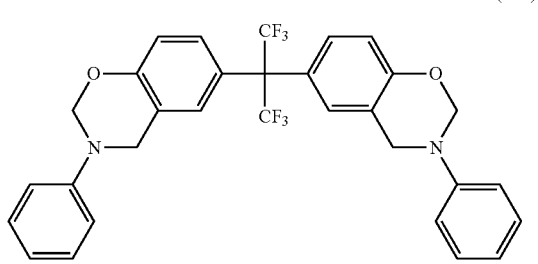

(Formula (B-4))

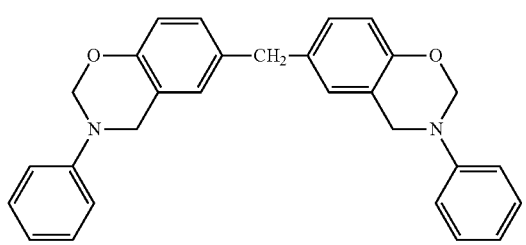

Formula (B-5)

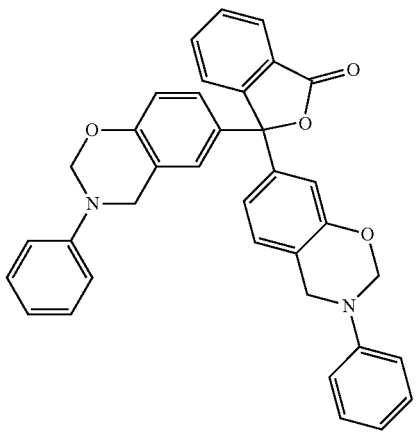

The compound (B-1) has been found to provide particularly good results.

Without being bond by this theory, the Applicant considers that the compound (B), during processing of the composition (C1) at a high temperature, would homopolymerize to form a crosslinking network, as well known for benzoxazine resins, hence conferring to the coated layer obtained from said composition (C1) additional adhesion and cohesion.

Polymers (P) which have been found suitable for use in the composition (C1) may have a completely amorphous structure, a partially or completely crystalline structure, or anything in between. Upon heating, these suitable thermoplastic polymers can melt, becoming sufficiently free flowing to permit processing using standard techniques (molding, extrusion, etc.). In certain embodiments, both amorphous and at least partially crystalline polymers (P) may be used.

Polymers (P) suitable for use in the present invention are preferably selected from the group consisting of aromatic polyimide polymers [polymers (PI)], preferably aromatic polyester-imide polymers [polymers (PEI)] and aromatic polyamide-imide polymers [polymers (PAI)], and aromatic sulfone polymers [polymers (SP)].

To the purpose of the present invention, the term "aromatic polyimide polymer [polymer (PI)]" is intended to denote any polymer comprising recurring units, more than 50% by moles of said recurring units comprising at least one aromatic ring and at least one imide group, as such (formula 1A) or in its amic acid form (formula 1B) [recurring units ($R_{PI}$)]:

formula 1A

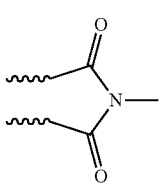

-continued

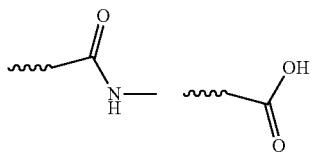
formula 1B

The imide group, as such or in its corresponding amic acid form, is advantageously linked to an aromatic ring, as illustrated below:

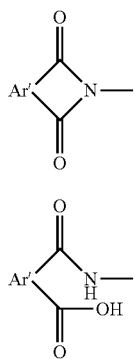
formula 2A formula 2B whereas Ar' denotes a moiety containing at least one aromatic ring.

The imide group is advantageously present as condensed aromatic system, yielding a five- or six-membered heteroaromatic ring, such as, for instance, with benzene (phthalimide-type structure, formula 3) and naphthalene (naphthalimide-type structure, formula 4).

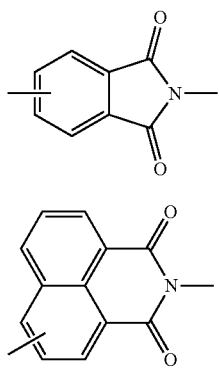
formula 3 formula 4

The formulae here below depict examples of recurring units ($R_{PI}$) (formulae 5A to 5C):

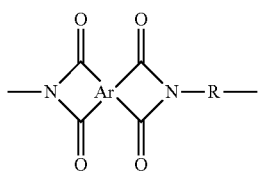
formula 5A

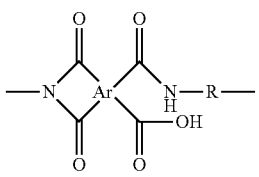
formula 5B

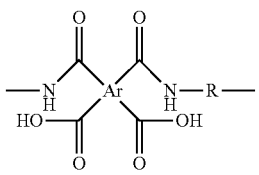
formula 5C wherein:

Ar represents an aromatic tetravalent group; typically Ar is selected from the group consisting of the following structures:

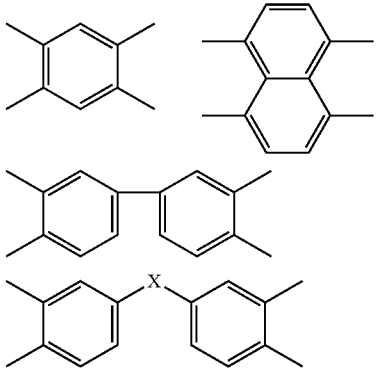

and corresponding optionally substituted structures, wherein X is —O—, —C(O)—, —CH$_2$—, —C(CF$_3$)$_2$—, —(CF$_2$)$_n$—, wherein n is an integer from 1 to 5;

R represents an aromatic divalent group; typically R is selected from the group consisting of the following structures:

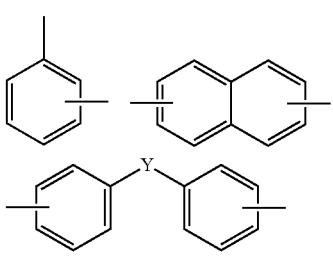

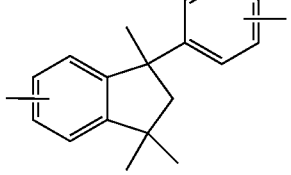

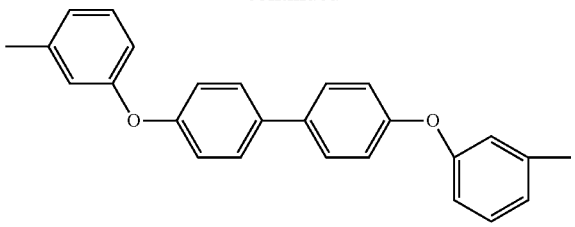

and corresponding optionally substituted structures, with Y being —O—, —S—, —SO$_2$—, —CH$_2$—, —C(O)—, —C(CF$_3$)$_2$—, —(CF$_2$)$_n$—, n being an integer from 0 to 5.

Polymers (P1) commercialized by DuPont as VESPEL® polyimides or by Mitsui as AURUM® polyimides are suitable for the purpose of the invention.

The recurring units (R$_{PI}$) of the polymer (P1) may comprise one or more functional groups other than the imide group, as such and/or in its amic acid form. Non limiting examples of polymers complying with this criterion are aromatic polyester-imide polymers [polymers (PEI)] and aromatic polyamide-imide polymers [polymers (PAI)].

To the purpose of the present invention, the term "aromatic polyester-imide polymer [polymer (PEI)]" is intended to denote any polymer comprising more than 50% by moles of recurring units comprising at least one aromatic ring, at least one imide group, as such and/or in its amic acid form, and at least one ester group [recurring units (R$_{PEI}$)]. Typically, the polymers (PEI) are manufactured by reacting at least one acid monomer selected from trimellitic anhydride and trimellitic anhydride monoacid halides with at least one diol, followed by reaction with at least one diamine.

To the purpose of the present invention, the term "aromatic polyamide-imide polymer [polymer (PAI)]" is intended to denote any polymer comprising more than 50% by moles of recurring units comprising at least one aromatic ring, at least one imide group, as such and/or in its amic acid form, and at least one amide group which is not included in the amic acid form of an imide group [recurring units (R$_{PAI}$)].

The recurring units (R$_{PAI}$) are advantageously selected from the group consisting of:

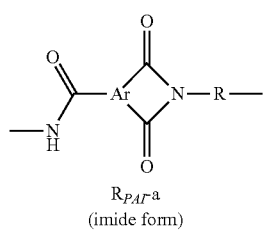

R$_{PAI}$-a
(imide form)

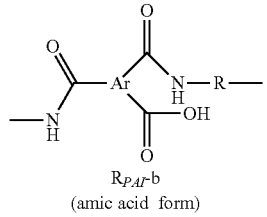

R$_{PAI}$-b
(amic acid form)

wherein:

Ar is a trivalent aromatic group; typically Ar is selected from the group consisting of the following structures:

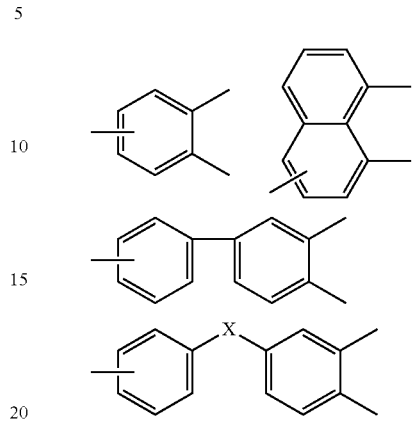

and corresponding optionally substituted structures, with X being —O—, —C(O)—, —CH$_2$—, —C(CF$_3$)$_2$—, —(CF$_2$)$_n$—, with n being an integer from 1 to 5;

R is a divalent aromatic group; typically R is selected from the group consisting of the following structures:

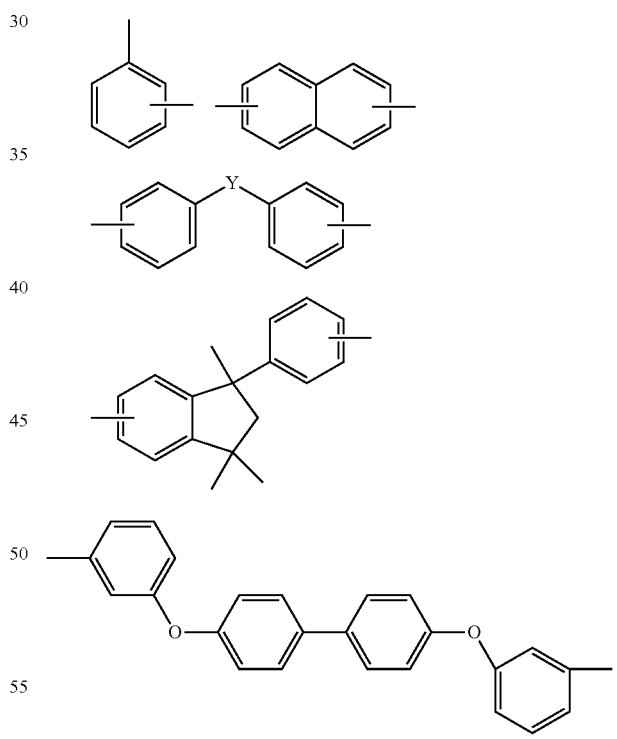

and corresponding optionally substituted structures, with Y being —O—, —S—, —SO$_2$—, —CH$_2$—, —C(O)—, —C(CF$_3$)$_2$—, —(CF$_2$)$_n$—, n being an integer from 0 to 5.

Preferably, the polymer (PAI) comprises more than 50% by moles of recurring units (R$_{PAI}$) comprising an imide group wherein the imide group is present as such, like in recurring units (R$_{PAI}$-a), and/or in its amic acid form, like in recurring units (R$_{PAI}$-b).

Recurring units ($R_{PAI}$) are preferably selected from recurring units (l), (m) and (n), in their amide-imide (a) or amide-amic acid (b) forms:

(I)

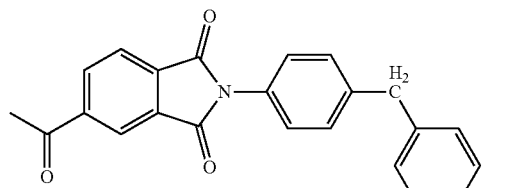

I-a
(amide-imide form)

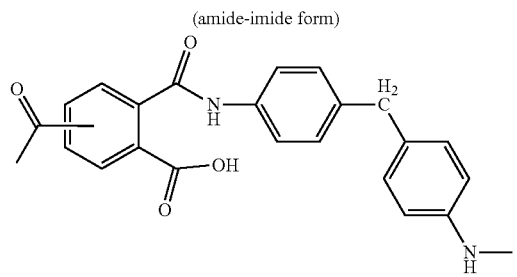

I-b
(amide-amic acid form)

wherein the attachment of the two amide groups to the aromatic ring as shown in (I-b) will be understood to represent the 1,3 and the 1,4 polyamide-amic acid configurations;

(m)

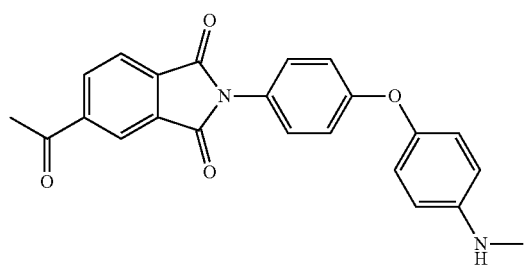

m-a
(amide-imide form)

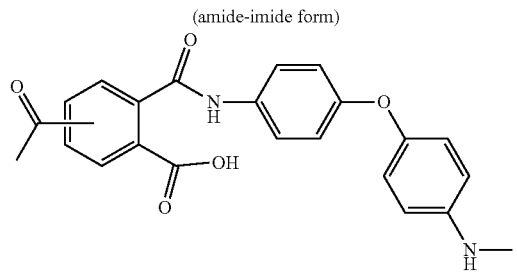

m-b
(amide-amic acid form)

wherein the attachment of the two amide groups to the aromatic ring as shown in (m-b) will be understood to represent the 1,3 and the 1,4 polyamide-amic acid configurations; and (n)

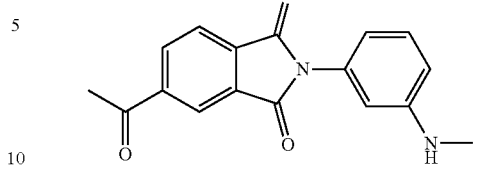

n-a
(amide-imide form)

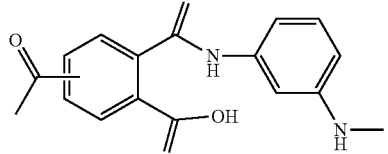

n-b
(amide-amic acid form)

wherein the attachment of the two amide groups to the aromatic ring as shown in (n-b) will be understood to represent the 1,3 and the 1,4 polyamide-amic acid configurations.

Very preferably, the polymer (PAI) comprises more than 90% by moles of recurring units ($R_{PAI}$). Still more preferably, it contains no recurring unit other than recurring units ($R_{PAI}$). Polymers (PAI) are commercialized by Solvay Specialty Polymers USA, L.L.C. under the trademark name TORLON®.

For the purpose of the invention, the term "aromatic sulfone polymer [polymer (SP)]" is intended to denote any polymer wherein at least 50% by moles of the recurring units thereof comprise at least one group of formula (SP) [recurring units ($R_{SP}$)]:

$$—Ar—SO_2—Ar'— \quad \text{formula (SP)}$$

wherein Ar and Ar', equal to or different from each other, are aromatic groups.

Recurring units ($R_{SP}$) are typically of formula:

wherein:
Ar$^1$, Ar$^2$, Ar$^3$, Ar$^4$, and Ar$^5$, equal to or different from each other and at each occurrence, are independently aromatic mono- or polynuclear groups;

T and T', equal to or different from each other and at each occurrence, is independently a bond or a divalent group optionally comprising one or more than one heteroatom; preferably T' is selected from the group consisting of a bond, —$CH_2$—, —C(O)—, —$C(CH_3)_2$—, —$C(CF_3)_2$—, —C(=$CCl_2$)—, —$SO_2$—, —$C(CH_3)(CH_2CH_2COOH)$—, and a group of formula:

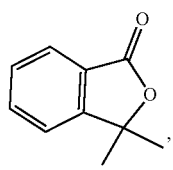

and
preferably T is selected from the group consisting of a bond, —CH₂—, —C(O)—, —C(CH₃)₂—, —C(CF₃)₂—, —C(=CCl₂)—, —C(CH₃)(CH₂CH₂COOH)—, and a group of formula:

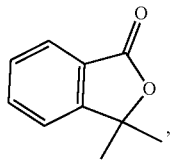

and
n and m, equal to or different from each other, are independently zero or an integer of 1 to 5.

Recurring units ($R_{SP}$) may be notably selected from the group consisting of those of formulae (S-A) to (S-D) herein below:

group consisting of a bond, —CH₂—, —C(O)—, —C(CH₃)₂—, —C(CF₃)₂—, —C(=CCl₂)—, —C(CH₃)(CH₂CH₂COOH)—, —SO₂—, and a group of formula:

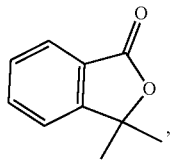

and
preferably T is selected from the group consisting of a bond, —CH₂—, —C(O)—, —C(CH₃)₂—, —C(CF₃)₂—,

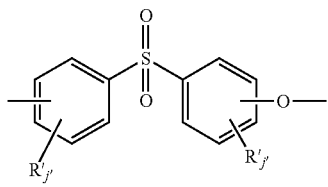 (S-A)

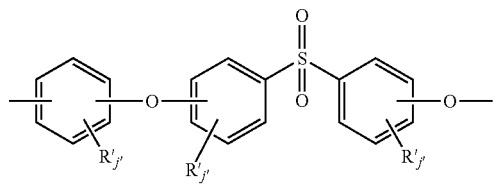 (S-B)

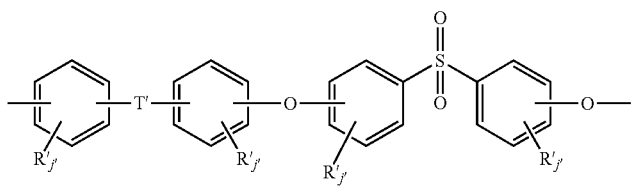 (S-C)

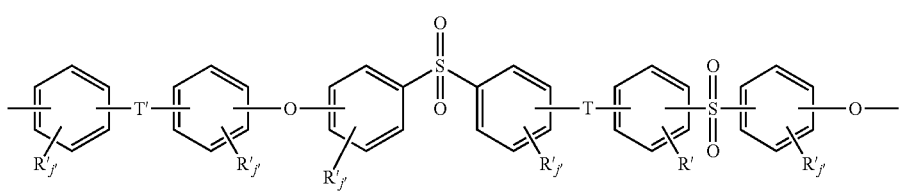 (S-D)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4;
T and T', equal to or different from each other are a bond or a divalent group optionally comprising one or more than one heteroatom; preferably T' is selected from the —C(=CCl₂)—, —C(CH₃)(CH₂CH₂COOH)—, and a group of formula:

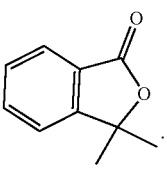

The polymer (SP) typically has a glass transition temperature of advantageously at least 150° C., preferably at least 160° C., more preferably at least 175° C.

In a first preferred embodiment of the invention, at least 50% by moles of the recurring units of the polymer (SP) are recurring units ($R_{SP-1}$), in their imide form ($R_{SP-1}$-A) and/or amic acid forms [($R_{SP-1}$-B) and ($R_{SP-1}$-C)]:

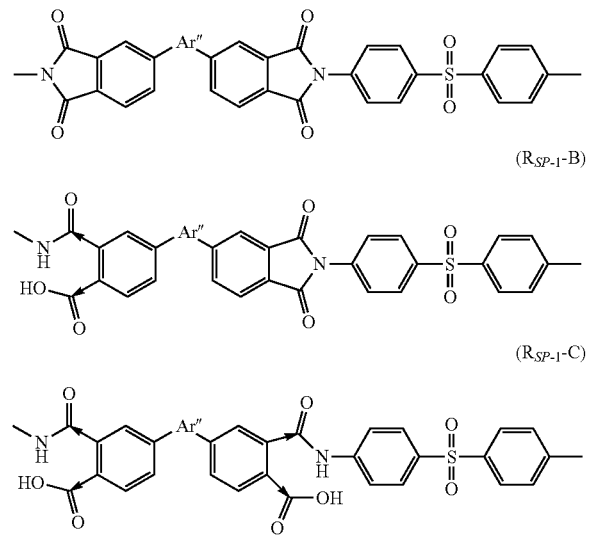

wherein:
the → denotes isomerism so that in any recurring unit the groups to which the arrows point may exist as shown or in an interchanged position;
Ar" is selected from the group consisting of:

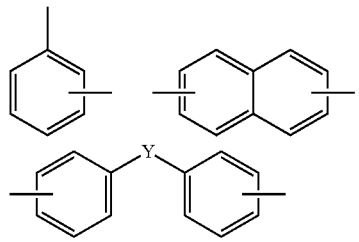

and corresponding optionally substituted structures, with Y being —O—, —C(O)—, —(CH$_2$)$_n$—, —C(CF$_3$)$_2$—, —(CF$_2$)$_n$—, wherein n is an integer from 1 to 5, and mixtures thereof.

In a second preferred embodiment of the invention, at least 50% by moles of the recurring units of the polymer (SP) are recurring units ($R_{SP-2}$) and/or recurring units ($R_{SP-3}$):

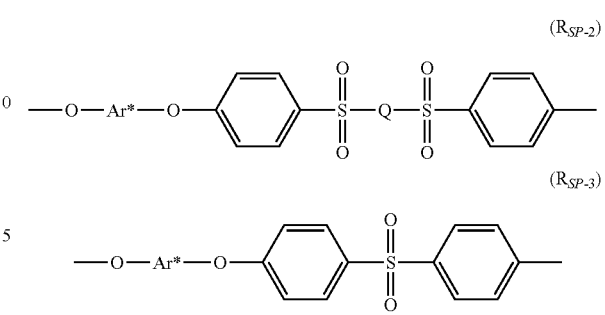

wherein:
Q and Ar*, equal to or different from each other and at each occurrence, are independently a divalent aromatic group; preferably Ar* and Q, equal to or different from each other and at each occurrence, are independently selected from the group consisting of the following structures:

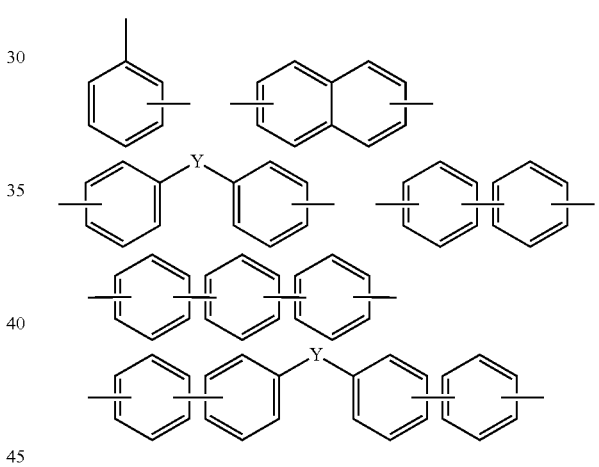

and corresponding optionally substituted structures, with Y being —O—, —CH═CH—, —C≡C—, —S—, —C(O)—, —(CH$_2$)$_n$—, —C(CF$_3$)$_2$—, —C(CH$_3$)$_2$—, —SO$_2$—, —(CF$_2$)$_n$—, wherein n is an integer from 1 to 5 and mixtures thereof; and mixtures thereof.

Recurring units ($R_{SP-2}$) are preferably selected from the group consisting of:

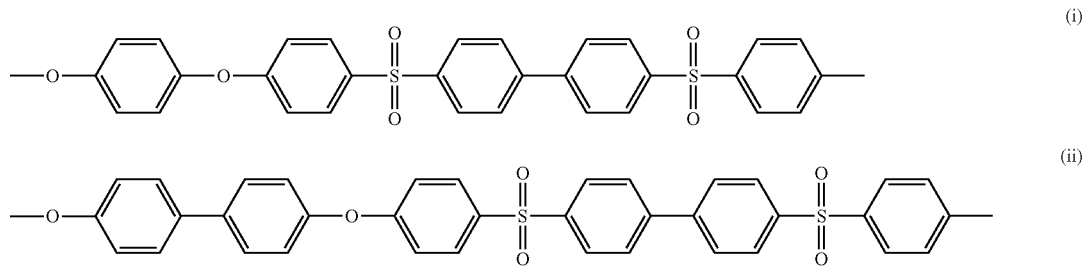

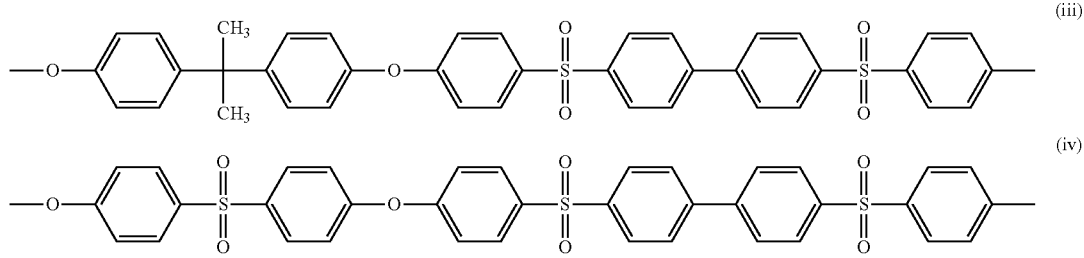

and mixtures thereof.

Recurring units ($R_{SP-3}$) are preferably selected from the group consisting of:

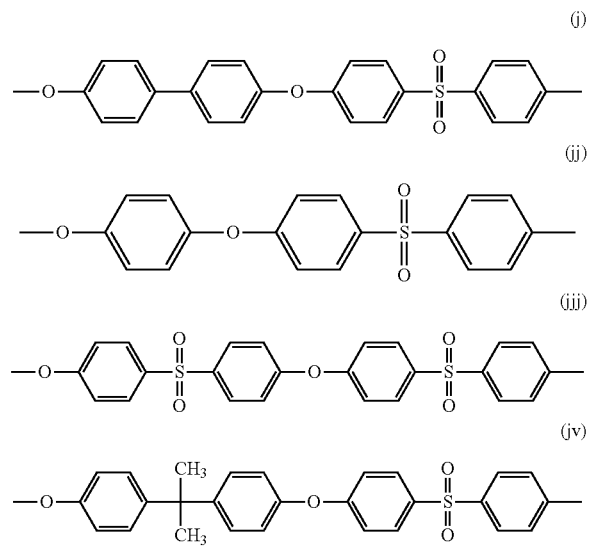

and mixtures thereof.

Polymers (SP) according to the second preferred embodiment of the invention comprises at least 50% by moles, preferably at least 70% by moles, more preferably at least 75% by moles of recurring units ($R_{SP-2}$) and/or ($R_{SP-3}$), still more preferably, it contains no recurring unit other than recurring units ($R_{SP-2}$) and/or ($R_{SP-3}$).

Good results have been obtained with polymers (SP) comprising recurring units (ii) (polybiphenyldisulfone, hereinafter), with polymers (SP) comprising recurring units (j) (polyphenylsulfone or PPSU, hereinafter), with polymers (SP) comprising recurring units (jj) (polyetherethersulfone, hereinafter), with polymers (SP) comprising recurring units (jjj) and, optionally, in addition, recurring units (jj) (polyethersulfone or PES, hereinafter), and with polymers (SP) comprising recurring units (jv) and, optionally in addition, recurring units (jj) (polysulfone, or PSF hereinafter).

Polyphenylsulfone (PPSU) is notably commercially available under the trademark name RADEL® R PPSU from Solvay Specialty Polymers USA, L.L.C.

Polysulfone (PSF) is notably commercially available under the trademark name UDEL® PSF from Solvay Specialty Polymers USA, L.L.C.

Polyethersulfone (PES) is notably commercially available under the trademark name RADEL® A PES or as VIRANTAGE® r-PES from Solvay Specialty Polymers USA, L.L.C.

The polymer (F) of the composition (C1) may be either a non-functional polymer (F) or a functional polymer (F).

The polymer (F) of the composition (C1) is preferably a polymer (FH) as defined above. The polymer (F) of the composition (C1) is preferably either a non-functional polymer (FH) or a functional polymer (FH).

Mixtures of at least one non-functional polymer (F) and at least one functional polymer (F) may be used in the composition (C1).

The composition (C1) advantageously comprises at least one polymer (F) in an amount of from 5% to 30% by weight, preferably from 10% to 25% by weight, more preferably from 10% to 20% by weight, with respect to the total weight of the composition (C1).

Should the composition (C1) further comprise at least one functional polymer (F), said composition (C1) typically comprises at least one non-functional polymer (F) and at least one functional polymer (F) in an amount of from 5% to 30% by weight, preferably from 10% to 25% by weight, more preferably from 10% to 20% by weight, with respect to the total weight of the composition (C1), wherein said at least one functional polymer (F) is an amount of from 0.1% to 20% by weight, with respect to the total weight of the composition (C1).

The composition (C1) advantageously comprises at least one compound (B) in an amount of from 1% to 50% by weight, preferably from 2% to 40% by weight, more preferably from 3% to 30% by weight, with respect to the total weight of the composition (C1).

Generally, at least one polymer (F) and at least one compound (B) are used in the composition (C1) in an amount such that the weight ratio of the overall amount of polymer(s) (F) to the overall amount of compound(s) (B) is comprised between 2:1 and 1:2.

The composition (C1) generally comprises at least one polymer (F) and at least one polymer (P) in amount such that the weight ratio of the overall amount of polymer(s) (P) to the overall amount of polymer(s) (F) is generally comprised between 1:10 and 1:15.

According to a preferred embodiment of the invention, the composition (C1) comprises at least one polymer (F), at least one compound (B) and at least one polymer (PI), as defined above.

Still, according to a more preferred embodiment of the invention, the composition (C1) comprises at least one polymer (F), at least one compound (B) and at least one polymer (PAI), as defined above.

The composition (C1) may further comprise at least one filler, typically at least one filler selected from the group consisting of inorganic and organic fillers.

The composition (C1) preferably consists of at least one polymer (F), optionally, at least one functional polymer (F), at least one compound (B), at least one polymer (P) and, optionally, at least one filler, typically at least one filler selected from the group consisting of inorganic and organic fillers.

Non limiting examples of inorganic fillers suitable for use in the composition (C1) include inorganic fillers selected from mica such as mica coated with metal oxides, mineral fillers such as talc, inorganic oxides, carbides, borides and nitrides, preferably inorganic oxides, carbides, borides and nitrides of zirconium, tantalum, titanium, tungsten, boron, aluminium and beryllium.

Non limiting examples of other fillers suitable for use in the composition (C1) include the following compounds:
- at least one pigment, preferably selected from the group consisting of titanium dioxide which is notably available form Whittaker, Clark & Daniels, South Plainfield, N.J., USA; Artic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepherd Color Company, Cincinnati, Ohio, USA; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR® pigments available from Engelhard Industries, Edison, N.J., USA;
- at least one rheology modifier, preferably selected from the group consisting of modified polyamides, modified urea, polyethylene waxes and organic derivatives of bentonite clays;
- at least one defoaming agent, preferably selected from the group consisting of polydimethyl siloxanes, in particular modified polydimethyl siloxanes, fluorinated silicones; and
- at least one surfactant, preferably selected from the group consisting of alkyl ethoxylated alcohols and alkylphenol ethoxylated alcohols.

Should the composition (C1) further comprise at least one filler, said composition (C1) typically comprises at least one filler in an amount of from 0.5% to 25% by weight, preferably from 1% to 20% by weight, with respect to the total weight of the composition (C1).

The functional polymer (F) of the composition (C2) is preferably a functional polymer (FH) as defined above.

The composition (C2) advantageously comprises at least one functional polymer (F) in an amount of from 50% to 100% by weight, preferably from 70% to 100% by weight, more preferably from 85% to 100% by weight, with respect to the total weight of the composition (C2).

The composition (C2) may further comprise at least one filler, typically at least one filler selected from the group consisting of inorganic and organic fillers.

The composition (C2) preferably consists of at least one functional polymer (F) and, optionally, at least one filler, typically at least one filler selected from the group consisting of inorganic and organic fillers.

Non limiting examples of inorganic fillers suitable for use in the composition (C2) include inorganic fillers selected from mica such as mica coated with metal oxides, mineral fillers such as talc, inorganic oxides, carbides, borides and nitrides, preferably inorganic oxides, carbides, borides and nitrides of zirconium, tantalum, titanium, tungsten, boron, aluminium and beryllium.

Non limiting examples of organic fillers suitable for use in the composition (C2) include non-functional polymers (F) as defined above.

Should the composition (C2) further comprise at least one filler, said composition (C2) typically comprises at least one filler in an amount of from 15% to 50% by weight, preferably from 30% to 50% by weight, with respect to the total weight of the composition (C2).

The polymer (F) of the composition (C3) may be either a non-functional polymer (F) or a functional polymer (F).

The polymer (F) of the composition (C3) is preferably a polymer (FH) as defined above. The polymer (F) of the composition (C3) is preferably either a non-functional polymer (FH) or a functional polymer (FH), more preferably a non-functional polymer (FH).

The composition (C3) advantageously comprises at least one polymer (F) in an amount of from 50% to 100% by weight, preferably from 70% to 100% by weight, more preferably from 80% to 100% by weight, with respect to the total weight of the composition (C3).

The composition (C3) may further comprise at least one filler, typically at least one filler selected from the group consisting of inorganic and organic fillers.

The composition (C3) preferably consists of at least one polymer (F) and, optionally, at least one filler, typically at least one filler selected from the group consisting of inorganic and organic fillers.

Non limiting examples of inorganic fillers suitable for use in the composition (C3) include inorganic fillers selected from mica such as mica coated with metal oxides, mineral fillers such as talc, inorganic oxides, carbides, borides and nitrides, preferably inorganic oxides, carbides, borides and nitrides of zirconium, tantalum, titanium, tungsten, boron, aluminium and beryllium.

Non limiting examples of organic fillers suitable for use in the composition (C3) include polymers (SP), preferably poly(sulfonyl-p-phenylene).

Should the composition (C3) further comprise at least one filler, said composition (C3) typically comprises at least one filler in an amount of from 0.1% to 50% by weight, preferably from 5% to 30% by weight, with respect to the total weight of the composition (C3).

Each of the layer (L2) and layer (L3), if any, of the multilayer assembly of the invention may be either a monolayer or a multilayer.

For the purpose of the present invention, the term "monolayer" is used according to its usual meaning to denote a single layer.

For the purpose of the present invention, the term "multilayer" is used according to its usual meaning to denote an assembly consisting of at least two layers.

The multilayer assembly of the invention preferably comprises:
- a metal substrate, said metal substrate having an inner surface and an outer surface,
- a layer [layer (L1)] consisting of a composition [composition (C1)] comprising at least one fluoropolymer [polymer (F)], at least one benzoxazine compound [compound (B)] and at least one aromatic polymer [polymer (P)], said layer (L1) having a first surface and a second surface, wherein the first surface of said layer (L1) is at least partially adhered to the inner surface of said metal substrate,
- a layer [layer (L2)] consisting of a composition [composition (C2)] comprising at least one functional fluoropolymer [functional polymer (F)], said layer (L2) having a first surface and a second surface, wherein the first surface of said layer (L2) is at least partially adhered to the second surface of said layer (L1), and optionally, a layer [layer (L3)] consisting of a composition [composition (C3)] comprising at least one fluoropolymer [polymer (F)], said polymer (F) being equal to or different from the polymer (F) of the layer (L1), said layer (L3) having a first surface and a second surface, wherein the first surface of said layer (L3) is at least partially adhered to the second surface of said layer (L2).

The multilayer assembly of the invention is typically in the form of either a multilayer film or of a multilayer shaped article such as a pipe.

In a second instance, the present invention pertains to a process for the manufacture of a multilayer assembly, said process comprising:
(i) providing a metal substrate, said metal substrate having an inner surface and an outer surface;
(ii) applying a layer (L1) as defined above onto at least one of the inner surface and the outer surface of said metal substrate; and
(iii) applying a layer (L2) as defined above onto the layer (L1) as provided in step (ii).

The process for the manufacture of the multilayer assembly according to the invention typically further comprises:
(iv) applying a layer (L3) as defined above onto the layer (L2) as provided in step (iii).

The multilayer assembly of the invention is advantageously obtainable by the process of the invention.

In a third instance, the present invention pertains to use of the multilayer assembly of the invention in oil and gas applications.

Under step (i) of the process of the invention, the metal substrate is typically:
(i-a) cleaned using a suitable solvent, preferably an alcohol or an inorganic solvent, and/or
(i-b) treated by any of abrasive blasting techniques including, but not limited to, wet abrasive blasting, hydro-blasting and micro-abrasive blasting using either an organic solvent or a mineral solvent, such as for example $H_3PO_4$.

Under step (ii) of the process of the invention, the composition (C1) is typically used as a liquid composition further comprising a liquid medium [medium (L)] comprising one or more organic solvents.

For the purpose of the present invention, the term "liquid medium [medium (L)]" is intended to denote a medium comprising one or more compounds in liquid state at 20° C. under atmospheric pressure.

The choice of the organic solvent is not particularly limited.

The medium (L) typically comprises one or more organic solvents selected from the group consisting of diesters of formula ($I_{de}$), esteramides of formula ($I_{ea}$) and diamides of formula ($I_{da}$):

$$R^1O(O)C-Z_{de}-C(O)OR^2 \quad (I_{de})$$

$$R^3O(O)C-Z_{ea}-C(O)NR^4R^5 \quad (I_{ea})$$

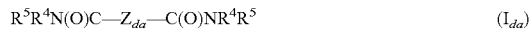

$$R^5R^4N(O)C-Z_{da}-C(O)NR^4R^5 \quad (I_{da})$$

wherein:
$R^1$ and $R^2$, equal to or different from each other, are independently selected from the group consisting of $C_1$-$C_3$ hydrocarbon groups,
$R^3$ is selected from the group consisting of $C_1$-$C_{20}$ hydrocarbon groups, and
$R^4$ and $R^5$, equal to or different from each other, are independently selected from the group consisting of hydrogen and $C_1$-$C_{36}$ hydrocarbon groups, optionally substituted, being understood that $R^4$ and $R^5$ might be part of a cyclic moiety including the nitrogen atom to which they are bound, said cyclic moiety being optionally substituted and/or optionally comprising one or more heteroatoms, and mixtures thereof, and $Z_{de}$, $Z_{ea}$ and $Z_{da}$, equal to or different from each other, are independently linear or branched $C_2$-$C_{10}$ divalent alkylene groups.

The medium (L) typically comprises a total amount of one or more organic solvents selected from the group consisting of diesters of formula ($I_{de}$), esteramides of formula ($I_{ea}$) and diamides of formula ($I_{da}$) as defined above of at least 50% by weight, preferably at least 60% by weight, more preferably at least 70% by weight, with respect to the total weight of the medium (L).

In formula ($I_{de}$), $R^1$ and $R^2$, equal to or different from each other, are preferably independently selected from the group consisting of $C_1$-$C_3$ alkyl groups such as methyl, ethyl and n-propyl groups, more preferably being methyl groups.

In formula ($I_{ea}$), $R^3$ is preferably selected from the group consisting of $C_1$-$C_{20}$ alkyl groups.

In formulae ($I_{ea}$) and ($I_{da}$), $R^4$ and $R^5$, equal to or different from each other, are preferably independently selected from the group consisting of $C_1$-$C_{20}$ alkyl, $C_1$-$C_{20}$ aryl, $C_1$-$C_{20}$ alkyaryl and $C_1$-$C_{20}$ arylalkyl groups, all said groups optionally comprising one or more substituents, optionally comprising one or more heteroatoms, and cyclic moieties comprising both $R^4$ and $R^5$ and the nitrogen atom to which they are bound, said cyclic moieties optionally comprising one or more heteroatoms such as oxygen atoms or additional nitrogen atoms.

The expression "$C_1$-$C_{20}$ alkyl" is used according to its usual meaning and it encompasses notably linear, cyclic, branched saturated hydrocarbon groups having from 1 to 20 carbon atoms, preferably from 1 or 2 to 10 carbon atoms, more preferably from 1 to 3 carbon atoms.

The expression "$C_1$-$C_{20}$ aryl" is used according to its usual meaning and it encompasses notably aromatic mono- or poly-cyclic groups, preferably mono- or bi-cyclic groups, comprising from 6 to 12 carbon atoms, preferably phenyl or naphthyl groups.

The expression "$C_1$-$C_{20}$ arylalkyl" is used according to its usual meaning and it encompasses linear, branched or cyclic saturated hydrocarbon groups comprising, as substituent, one or more aromatic mono- or poly-cyclic groups such as benzyl groups.

The expression "$C_1$-$C_{20}$ alkylaryl" is used according to its usual meaning and it encompasses aromatic mono- or poly-cyclic groups comprising, as substituent, one or more alkyl groups such as linear, cyclic, branched saturated hydrocarbon chains having from 1 to 14 carbon atoms and preferably from 1 or 2 to 10 carbon atoms.

In formula ($I_{ea}$), $R^3$ is more preferably selected from the group consisting of methyl, ethyl, hydroxyethyl, n-propyl, isopropyl, n-butyl, isobutyl, terbutyl, n-pentyl, isopentyl, n-hexyl and cyclohexyl groups, most preferably from the group consisting of methyl, ethyl and hydroxyethyl groups.

According to a first embodiment of the invention, $Z_{de}$ in formula ($I_{de}$), $Z_{ea}$ in formula ($I_{ea}$) and $Z_{da}$ in formula ($I_{da}$) are branched $C_2$-$C_{10}$ divalent alkylene groups, preferably branched $C_3$-$C_6$ divalent alkylene groups.

According to this first embodiment of the invention, $Z_{de}$ in formula ($I_{de}$), $Z_{ea}$ in formula ($I_{ea}$) and $Z_{da}$ in formula ($I_{da}$) are preferably selected from the group consisting of:

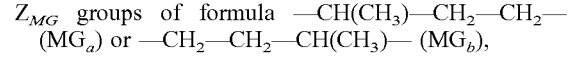

$Z_{MG}$ groups of formula $-CH(CH_3)-CH_2-CH_2-$ ($MG_a$) or $-CH_2-CH_2-CH(CH_3)-$ ($MG_b$), $Z_{ES}$ groups of formula —CH($C_2H_5$)—$CH_2$— ($ES_a$) or —$CH_2$—CH($C_2H_5$)— ($ES_b$), and mixtures thereof.

According to a first variant of this first embodiment of the invention, the medium (L) comprises:

(a') at least one diester of formula ($I'_{de}$), at least one diester of formula ($I''_{de}$) and, optionally, at least one diester of formula ($I'''_{de}$), or (b') at least one esteramide of formula ($I'_{ea}$), at least one esteramide of formula ($I''_{ea}$) and, optionally, at least one esteramide of formula ($I'''_{ea}$), or (c') at least one esteramide of formula ($I'_{ea}$), at least one esteramide of formula ($I''_{ea}$), at least one diamide of formula ($I'_{da}$), at least one diamide of formula ($I''_{da}$) and, optionally, at least one esteramide of formula ($I'''_{ea}$) and/or at least one diamide of formula ($I'''_{da}$), or (d') combinations of (a') and/or (b') and/or (c'), wherein:
- ($I'_{de}$) is $R^1$—O(O)C—$Z_{MG}$—C(O)O—$R^2$
- ($I'_{ea}$) is $R^3$—O(O)C—$Z_{MG}$—C(O)N$R^4R^5$
- ($I'_{da}$) is $R^5R^4$N(O)C—$Z_{MG}$—C(O)N$R^4R^5$
- ($I''_{de}$) is $R^1$—O(O)C—$Z_{ES}$—C(O)O—$R^2$
- ($I''_{ea}$) is $R^3$—O(O)C—$Z_{ES}$—C(O)N$R^4R^5$
- ($I''_{da}$) is $R^5R^4$N(O)C—$Z_{ES}$—C(O)N$R^4R^5$
- ($I'''_{de}$) is $R^1$—O(O)C—$(CH_2)_4$—C(O)O—$R^2$ and
- ($I'''_{ea}$) is $R^3$—O(O)C—$(CH_2)_4$—C(O)N$R^4R^5$
- ($I'''_{da}$) is $R^5R^4$N(O)C—$(CH_2)_4$—C(O)N$R^4R^5$ wherein:
$Z_{MG}$ is of formula —CH($CH_3$)—$CH_2$—$CH_2$— ($MG_a$) or —$CH_2$—$CH_2$—CH($CH_3$)— ($MG_b$),
$Z_{ES}$ is of formula —CH($C_2H_5$)—$CH_2$— ($ES_a$) or —$CH_2$—CH($C_2H_5$)— ($ES_b$),
$R^1$ and $R^2$, equal to or different from each other, are independently selected from the group consisting of $C_1$-$C_3$ alkyl groups,
$R^3$ is selected from the group consisting of $C_1$-$C_{20}$ alkyl, $C_1$-$C_{20}$ aryl, $C_1$-$C_{20}$ alkyaryl and $C_1$-$C_{20}$ arylalkyl groups, and
$R^4$ and $R^5$, equal to or different from each other, are independently selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups optionally comprising one or more substituents, optionally having one or more heteroatoms, and cyclic moieties comprising both $R^4$ and $R^5$ and the nitrogen atom to which they are bound, said cyclic moieties optionally comprising one or more heteroatoms such as oxygen atoms or additional nitrogen atoms.

In above mentioned formulae ($I'_{de}$), ($I''_{de}$), ($I'''_{de}$), ($I'_{ea}$), ($I''_{ea}$), ($I'''_{ea}$), ($I'_{da}$), ($I''_{da}$), ($I'''_{da}$), $R^1$, $R^2$ and $R^3$, equal to or different from each other, are preferably methyl groups, and $R^4$ and $R^5$, equal to or different from each other, are preferably selected from the group consisting of methyl, ethyl and hydroxyethyl groups.

According to this first variant of the first embodiment of the invention, the medium (L) may comprise:

(aa') a diester mixture consisting essentially of:
- from 70% to 95% by weight of at least one diester of formula ($I'_{de}$),
- from 5% to 30% by weight of at least one diester of formula ($I''_{de}$) and
- from 0 to 10% by weight of at least one diester of formula ($I'''_{de}$), as defined above, or (bb') an esteramide mixture consisting essentially of:
- from 70% to 95% by weight of at least one esteramide of formula ($I'_{ea}$),
- from 5% to 30% by weight of at least one esteramide of formula ($I''_{ea}$) and
- from 0 to 10% by weight of at least one esteramide of formula ($I'''_{ea}$), as defined above, or (cc') a diester/esteramide/diamide mixture consisting essentially of:
- from 1.4% to 1.9% by weight of at least one diester of formula ($I'_{de}$),
- from 0.1% to 0.6% by weight of at least one diester of formula ($I''_{de}$),
- from 0 to 0.2% by weight of at least one diester of formula ($I'''_{de}$),
- from 70% to 95% by weight of at least one esteramide of formula ($I'_{ea}$),
- from 5% to 30% by weight of at least one esteramide of formula ($I''_{ea}$),
- from 0 to 10% by weight of at least one esteramide of formula ($I'''_{ea}$),
- from 0.01% to 10% by weight of at least one diamide of formula ($I'_{da}$),
- from 0.01% to 5% by weight of at least one diamide of formula ($I''_{da}$) and
- from 0 to 1% by weight of at least one diamide of formula ($I'''_{da}$), or (dd') mixtures of (aa') and/or (bb') and/or (cc'), as defined above.

Non limiting examples of suitable media (L) wherein $Z_{de}$ in formula ($I_{de}$) and/or $Z_{ea}$ in formula ($I_{ea}$) and/or $Z_{da}$ in formula ($I_{da}$) are branched $C_2$-$C_{10}$ divalent alkylene groups, preferably branched $C_3$-$C_6$ divalent alkylene groups, include, notably, RHODIASOLV® IRIS solvents and RHODIASOLV® POLARCLEAN solvents.

RHODIASOLV® IRIS solvent is a mixture consisting essentially of at least 80% by weight of $H_3CO(O)C$—CH($CH_3$)—$CH_2$—$CH_2$—C(O)$OCH_3$ and $H_3CO(O)C$—CH($C_2H_5$)—$CH_2$—C(O)$OCH_3$.

RHODIASOLV® POLARCLEAN solvent is a mixture consisting essentially of at least 80% by weight of $H_3CO$(O)C—CH($CH_3$)—$CH_2$—$CH_2$—C(O)N($CH_3$)$_2$ and $H_3CO$(O)C—CH($C_2H_5$)—$CH_2$—C(O)N($CH_3$)$_2$.

According to a second embodiment of the invention, $Z_{de}$ in formula ($I_{de}$), $Z_{ea}$ in formula ($I_{ea}$) and $Z_{da}$ in formula ($I_{da}$) are linear $C_2$-$C_{10}$ divalent alkylene groups, preferably linear $C_3$-$C_6$ divalent alkylene groups.

According to a variant of this second embodiment of the invention, the medium (L) comprises:

(a") at least one diester of formula ($II^4_{de}$), at least one diester of formula ($II^3_{de}$) and at least one diester of formula ($II^2_{de}$), or (b") at least one esteramide of formula ($II^4_{ea}$), at least one esteramide of formula ($II^3_{ea}$) and at least one esteramide of formula ($II^2_{ea}$), or (c") at least one esteramide of formula ($II^4_{ea}$), at least one esteramide of formula ($II^3_{ea}$), at least one esteramide of formula ($II^2_{ea}$), at least one diamide of formula ($II^4_{da}$), at least one diamide of formula ($II^3_{da}$) and at least one diamide of formula ($II^2_{da}$), or (d") mixtures of (a") and/or (b") and/or (c"), wherein:
- ($II^4_{de}$) is $R^1$—OOC—$(CH_2)_4$—COO—$R^2$
- ($II^3_{de}$) is $R^1$—OOC—$(CH_2)_3$—COO—$R^2$
- ($II^2_{de}$) is $R^1$—OOC—$(CH_2)_2$—COO—$R^2$
- ($II^4_{ea}$) is $R^3$—OOC—$(CH_2)_4$—C(O)N$R^4R^5$
- ($II^3_{ea}$) is $R^3$—OOC—$(CH_2)_3$—C(O)N$R^4R^5$
- ($II^2_{ea}$) is $R^3$—OOC—$(CH_2)_2$—C(O)N$R^4R^5$
- ($II^4_{da}$) is $R^5R^4$N(O)C—$(CH_2)_4$—C(O)N$R^4R^5$
- ($II^3_{da}$) is $R^5R^4$N(O)C—$(CH_2)_3$—C(O)N$R^4R^5$
- ($II^2_{da}$) is $R^5R^4$N(O)C—$(CH_2)_2$—C(O)N$R^4R^5$ wherein:
- R$^1$ and R$^2$, equal to or different from each other, are independently selected from the group consisting of C$_1$-C$_3$ alkyl groups,
- R$^3$ is selected from the group consisting of C$_1$-C$_{20}$ alkyl, C$_1$-C$_{20}$ aryl, C$_1$-C$_{20}$ alkyaryl and C$_1$-C$_{20}$ arylalkyl groups, and
- R$^4$ and R$^5$, equal to or different from each other, are independently selected from the group consisting of C$_1$-C$_{20}$ alkyl, C$_1$-C$_{20}$ aryl, C$_1$-C$_{20}$ alkyaryl, C$_1$-C$_{20}$ arylalkyl groups, all said groups optionally comprising one or more substituents, optionally having one or more heteroatoms, and cyclic moieties comprising both R$^4$ and R$^5$ and the nitrogen atom to which they are bound, said cyclic moieties optionally comprising one or more heteroatoms such as oxygen atoms or additional nitrogen atoms.

In above mentioned formulae (II$^4_{de}$), (II$^3_{de}$), (II$^2_{de}$), (II$^4_{ea}$), (II$^3_{ea}$), (II$^2_{ea}$), (II$^4_{da}$) (II$^3_{da}$), (II$^2_{da}$), R$^1$, R$^2$ and R$^3$, equal to or different from each other, are preferably methyl groups, and R$^4$ and R$^5$, equal to or different from each other, are preferably selected from the group consisting of methyl, ethyl and hydroxyethyl groups.

According to certain preferred variants of this second embodiment of the invention, the medium (L) may comprise:
(aa") a diester mixture consisting essentially of H$_3$CO(O)C—(CH$_2$)$_4$—C(O)OCH$_3$, H$_3$CO(O)C—(CH$_2$)$_3$—C(O)OCH$_3$ and H$_3$CO(O)C—(CH$_2$)$_2$—C(O)OCH$_3$, or
(bb") an esteramide mixture consisting essentially of H$_3$CO(O)C—(CH$_2$)$_4$—C(O)N(CH$_3$)$_2$, H$_3$CO(O)C—(CH$_2$)$_3$—C(O)N(CH$_3$)$_2$ and H$_3$CO(O)C—(CH$_2$)$_2$—C(O)N(CH$_3$)$_2$, or
(cc") a diester mixture of consisting essentially of H$_5$C$_2$O(O)C—(CH$_2$)$_4$—C(O)OC$_2$H$_5$, H$_5$C$_2$O(O)C—(CH$_2$)$_3$—C(O)OC$_2$H$_5$ and H$_5$C$_2$O(O)C—(CH$_2$)$_2$—C(O)OC$_2$H$_5$, or
(dd") an esteramide mixture consisting essentially of H$_5$C$_2$O(O)C—(CH$_2$)$_4$—C(O)N(CH$_3$)$_2$, H$_5$C$_2$O(O)C—(CH$_2$)$_3$—C(O)N(CH$_3$)$_2$ and H$_5$C$_2$O(O)C—(CH$_2$)$_2$—C(O)N(CH$_3$)$_2$, or
(ee") an esteramide mixture consisting essentially of H$_9$C$_4$O(O)C—(CH$_2$)$_4$—C(O)N(CH$_3$)$_2$, H$_9$C$_4$O(O)C—(CH$_2$)$_3$—C(O)N(CH$_3$)$_2$ and H$_9$C$_4$O(O)C—(CH$_2$)$_2$—C(O)N(CH$_3$)$_2$, or
(ff") mixtures thereof.

An exemplary embodiment of the variant listed above under section (aa") is a diester mixture consisting essentially of:
- from 8% to 22% by weight of H$_3$CO(O)C—(CH$_2$)$_4$—C(O)OCH$_3$,
- from 57% to 67% by weight of H$_3$CO(O)C—(CH$_2$)$_3$—C(O)OCH$_3$ and
- from 18% to 28% by weight of H$_3$CO(O)C—(CH$_2$)$_2$—C(O)OCH$_3$.

Non limiting examples of suitable diester-based mixtures wherein Z$_{de}$ in formula (I$_{de}$) and/or Z$_{ea}$ in formula (I$_{ea}$) and/or Z$_{da}$ in formula (I$_{da}$) are linear C$_2$-C$_{10}$ divalent alkylene groups, preferably linear C$_3$-C$_6$ divalent alkylene groups, include, notably, RHODIASOLV® RPDE solvents.

RHODIASOLV® RPDE solvent is a mixture consisting essentially of at least 70% by weight of H$_3$CO(O)C—(CH$_2$)$_3$—C(O)OCH$_3$ and H$_3$CO(O)C—(CH$_2$)$_2$—C(O)OCH$_3$.

According to a third embodiment of the invention, the medium (L) comprises:
(a''') at least one diester of formula (I$_{de}$) and
(b''') at least one alkyl acetate of formula (I$_{aa}$):

$$R^9\text{—OC(O)CH}_3 \qquad (I_{aa})$$

wherein R$^9$ is a linear, branched or cyclic C$_3$-C$_{15}$ alkyl group, preferably a C$_6$-C$_{15}$ alkyl group, more preferably a C$_6$-C$_{13}$ alkyl group, even more preferably a C$_6$-C$_{12}$ alkyl group.

According to a variant of this third embodiment of the invention, the medium (L) comprises: (aa''') a diester mixture consisting essentially of:
- from 70% to 95% by weight of at least one diester of formula (I'$_{de}$),
- from 5% to 30% by weight of at least one diester of formula (I"$_{de}$) and
- from 0 to 10% by weight of at least one diester of formula (I'''$_{de}$), as defined above, and (bb''') at least one alkyl acetate of formula (I$_{aa}$):

$$R^9\text{—OC(O)CH}_3 \qquad (I_{aa})$$

wherein R$^9$ is a linear, branched or cyclic C$_3$-C$_{15}$ alkyl group, preferably a C$_6$-C$_{15}$ alkyl group, more preferably a C$_6$-C$_{13}$ alkyl group, even more preferably a C$_6$-C$_{12}$ alkyl group.

According to a preferred variant of this third embodiment of the invention, the medium (L) comprises:
(aa''') from 50% to 80% by weight, preferably from 60% to 80% by weight of a diester mixture consisting essentially of:
- from 70% to 95% by weight of at least one diester of formula (I'$_{de}$),
- from 5% to 30% by weight of at least one diester of formula (I"$_{de}$) and
- from 0 to 10% by weight of at least one diester of formula (I'''$_{de}$), as defined above, and (bb''') from 20% to 50% by weight, preferably from 20% to 40% by weight of at least one alkyl acetate of formula (I$_{aa}$):

$$R^9\text{—OC(O)CH}_3 \qquad (I_{aa})$$

wherein R$^9$ is a linear, branched or cyclic C$_3$-C$_{15}$ alkyl group, preferably a C$_6$-C$_{15}$ alkyl group, more preferably a C$_6$-C$_{13}$ alkyl group, even more preferably a C$_6$-C$_{12}$ alkyl group.

Diesters of formula (I$_{de}$) which can be used in the composition of the invention can be prepared notably according to the teachings of U.S. Pat. No. 5,688,885 (DUPONT) 18 Nov. 1997. Esteramides of formula (I$_{ea}$), which can be used in the composition of the invention optionally in combination with diamides of formula (I$_{da}$), can be prepared notably according to the teachings of WO 2011/154661 (RHODIA OPERATIONS) 15, Dec. 2011 and WO 2009/092795 (RHODIA OPERATIONS) 30, Jul. 2009.

The medium (L) may further comprise dimethylsulfoxide (DMSO) and, optionally, at least one further organic solvent different from DMSO and from diesters of formula (I$_{de}$), esteramides of formula (I$_{ea}$) and diamides of formula (I$_{da}$) as defined above.

Should the medium (L) comprise at least one further organic solvent different from DMSO and from diesters of formula (I$_{de}$), esteramides of formula (I$_{ea}$) and diamides of formula (I$_{da}$) as defined above, the weight ratio between the total amounts of organic solvents selected from the group consisting of diesters of formula (I$_{de}$), esteramides of formula (I$_{ea}$) and diamides of formula (I$_{da}$) as defined above and DMSO is preferably from 1:99 to 99:1, preferably from 20:80 to 80:20, more preferably from 70:30 to 30:70.

Non limiting examples of suitable further organic solvents include, notably, the followings:
- aliphatic hydrocarbons including, more particularly, the paraffins such as, in particular, pentane, hexane, heptane, octane, nonane, decane, undecane, dodecane or cyclohexane, and naphthalene and aromatic hydrocarbons and more particularly aromatic hydrocarbons such as, in particular, benzene, toluene, xylenes, cumene, petroleum fractions composed of a mixture of alkylbenzenes, aliphatic or aromatic halogenated hydrocarbons including more particularly, perchlorinated hydrocarbons such as, in particular, tetrachloroethylene, hexachloroethane; partially chlorinated hydrocarbons such as dichloromethane, chloroform, 1,2-dichloroethane, 1,1,1-trichloroethane, 1,1,2,2-tetrachloroethane, pentachloroethane, trichloroethylene, 1-chlorobutane, 1,2-dichlorobutane, monochlorobenzene, 1,2-dichlorobenzene, 1,3-dichlorobenzene, 1,4-dichlorobenzene, 1,2,4-trichlorobenzene or mixture of different chlorobenzenes, aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF), glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, glycol ether esters such as ethylene glycol methyl ether acetate, ethylene glycol monoethyl ether acetate, ethylene glycol monobutyl ether acetate, alcohols such as methyl alcohol, ethyl alcohol, diacetone alcohol, ketones such as acetone, methylethylketone, methylisobutyl ketone, diisobutylketone, cyclohexanone, isophorone, linear or cyclic esters such as methyl acetoacetate, dimethyl phthalate, γ-butyrolactone, linear or cyclic carboxamides such as N,N-dimethylacetamide (DMAC), N,N-diethylacetamide, dimethylformamide (DMF), diethylformamide or N-methyl-2-pyrrolidone (NMP), organic carbonates for example dimethyl carbonate, diethyl carbonate, dipropyl carbonate, dibutyl carbonate, ethylmethyl carbonate, ethylene carbonate, vinylene carbonate, phosphoric esters such as trimethyl phosphate, triethyl phosphate, ureas such as tetramethylurea, tetraethylurea.

For embodiments wherein the medium (L) comprises one or more further organic solvents, the medium (L) is preferably free from organic solvents qualified as Carcinogenic, Mutagenic or Toxic to Reproduction according to chemical safety classification (CMR solvents); more specifically, the medium (L) is advantageously substantially free from NMP, DMF and DMAC.

The medium (L) is preferably free from any further organic solvent.

Under step (ii) of the process of the invention, the layer (L1) is typically applied by any suitable techniques, preferably by spray coating.

Under step (iii) of the process of the invention, the composition (C2) is preferably a solid composition, more preferably in the form of powder.

Under step (iii) of the process of the invention, the layer (L2) is typically applied by electrostatic powder coating.

Electrostatic powder coating is usually performed by means of an electrostatic spray gun, which uses the principle of electrophoresis that electrically polarized particles are attracted to a grounded or oppositely charged surface.

When electrostatic powder coating is used, the skilled person will select the proper output settings depending on the nature of the composition to be applied. Good results have been obtained by working between 10 and 60 kV and between 5 μA and 40 μA.

Under step (iv) of the process of the invention, if any, the composition (C3) may be either a solid composition or a liquid composition. Under step (iv) of the process of the invention, if any, the composition (C3) is preferably a solid composition, more preferably in the form of powder.

Under step (iv) of the process of the invention, if any, the layer (L3) is typically applied by any suitable techniques, preferably by electrostatic powder coating.

Optionally, in order to achieve a desired thickness of the layer (L2), step (iii) may be repeated, for example two or more than two times, before step (iv), if any.

Optionally, in order to achieve a desired thickness of the layer (L3), if any, step (iv) may be repeated, for example two or more than two times.

The multilayer assembly as provided in either step (iii) or step (iv) of the process of the invention may be baked at a temperature of from 280° C. to 380° C., preferably from 300° C. to 350° C.

The multilayer assembly as provided in either step (iii) or step (iv) of the process of the invention is typically baked for a period of from 10 minutes to 5 hours, preferably from 15 minutes to 2 hours.

The layer (L1) typically has a thickness comprised between 5 μm and 30 μm, preferably between 8 μm and 20 μm.

The layer (L2) typically has a thickness comprised between 20 μm and 500 μm, preferably between 30 μm and 200 μm.

The layer (L3), if any, typically has a thickness comprised between 50 μm and 700 μm, preferably between 70 μm and 250 μm.

The thickness is typically measured according to any suitable procedures.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Polymer (F-1) is intended to denote HYFLON® MFA P6010 TFE/PMVE copolymer powder commercially available from Solvay specialty Polymers Italy S.p.A.

Polymer (F-2) is intended to denote a TFE/PPVE copolymer powder having a melting point of 307° C. and a melt flow index of 2 g/10 min, as measured according to ASTM D 1238 standard method at 372° C. under a load of 5 Kg.

Compound (B-1) is intended to denote ARALDITE® MT 35600 benzoxazine resin commercially available from Huntsman, said resin being obtained by reaction of aniline, formaldehyde and bis-phenol A.

Polymer (P-1) is intended to denote TORLON® PAI AI10 polyamideimide commercially available from Solvay Specialty Polymers USA, LLC.

Solvent (S-1) is intended to denote POLARCLEAN® esteramide mixture consisting essentially of at least 80% by weight of $H_3CO(O)C-CH(CH_3)-CH_2-CH_2-C(O)N(CH_3)_2$ and $H_3CO(O)C-CH(C_2H_5)-CH_2-C(O)N(CH_3)_2$ commercially available from Rhodia.

General Procedure for the Manufacture of the Primer Composition (C1)

A liquid medium comprising DMSO and at least one of the diesters of formula ($I_{de}$) and esteramides of formula ($I_{ea}$) was prepared by blending and shaking the ingredients in a bottle at a temperature comprised between 20° C. and 35° C.

The compound (B) and at least one polymer (P) were added at room temperature and solubilised in the liquid medium through agitation on a bottle roller at a temperature comprised between 20° C. and 90° C. Once complete dissolution of said polymer(s) was achieved, the polymer (F) was added to the resulting transparent solution and the bottle was agitated on a bottle roller for additional 10 minutes. Following similar procedure (addition, followed by 10 minutes blending), the other ingredients were added in the following order:
- pigment;
- optional further solvent;
- surfactant;
- defoamer/deaerator;
- optional rheology modifier.

The resulting mixture was finally homogenized and milled in a glass beads blender, by adding an amount of glass beads equal to the volume of the obtained mixture, and blending the resulting dispersion in a Dispermat CV3 mixer for 10 minutes. Appropriate homogenization was checked by evaluation on grind gauge grooves so as to detect, if any, presence of aggregates/particles with dimension higher than 5 µm. In case any particle(s)/aggregate(s) of dimension higher than 5 µm was/were detected, additional grinding for 10 minutes was performed. Formulation was considered completed and well-dispersed only when after the composition was distributed with a scraper in the grooves of the grind gauge, no detected scratches or film discontinuities above 5 µm were detected.

General Procedure for the Manufacture of the Mid-Coat Composition (C2)

According to a first embodiment, the polymer (F) as provided in powder form was irradiated using beta rays under air atmosphere at an irradiation dose of 15 MRad thereby providing a functional fluoropolymer [functional polymer (F)]. The functional polymer (F) so obtained was then put in an oven at a temperature of 200° C. for 16 hours.

The identification and quantitative determination of the end groups in the functional polymer (F) was carried out using IR and NMR spectroscopies according to PIANCA, MAURIZIO, et al. End groups in fluoropolymers. *Journal of Fluorine Chemistry*. 1997, vol. 95, p. 71-84.

According to a second embodiment, the functional polymer (F) was manufactured by polymerization of tetrafluoroethylene (TFE), perfluoromethylvinylether (PMVE) and $CF_2=CF-O-CF_2CF_2-SO_2F$ (VEFS) according to the procedure as detailed below.

General Procedure for the Manufacture of the TFE/PMVE/VEFS Functional Polymer (F)

In a 22 l AISI 316 steel vertical autoclave, equipped with a stirrer working at 400 rpm, after vacuum having been made, 13.9 l of demineralized water, 10 ml of $CF_2=CF-O-CF_2CF_2-SO_2F$ (VEFS) and 128 g of a microemulsion prepared according to the procedure described in Example 1 of U.S. Pat. No. 4,864,006 (AUSIMONT S.P.A.) May 9, 1989 were introduced in sequence.

The autoclave was then heated up to the reaction temperature of 75° C. When this temperature was reached, 0.38 bar of ethane and 3.1 bar of perfluoromethylvinylether (PMVE) were introduced.

A gaseous mixture of TFE/PMVE in a molar ratio of 24:1 was fed by a compressor until reaching a pres-sure of 21 bar. Then, by a metering pump, 118 ml of a 0.0438 M solution of ammonium persulphate was fed. The polymerization pressure was maintained constant during polymerization: 3 ml of VEFS per 545 g of the monomeric mixture were fed to the reactor so that a total amount of 45 ml of VEFS was fed during the polymerization. When a set quantity of 8712 g of the monomeric gaseous mixture had been fed, the monomer feeding was interrupted and the pressure was let decrease until reaching 7.5 bar. The reactor was cooled down at room temperature and the stirring was stopped, the latex was dischar-ged and coagulated with $HNO_3$ (65% by weight) and the polymer was washed with demineralized water and dried at about 220° C.

The TFE/PMVE/VEFS functional polymer (F) so obtained (VEFS: 1% by weight, as measured by IR) had a melt flow index of 36 g/10 min, as measured according to ASTM D 1238 standard method at 372° C. under a load of 5 Kg, and a second melting temperature of 278.3° C., as measured by differential scanning calorimetry.

EXAMPLE 1: GENERAL PROCEDURE FOR THE MANUFACTURE OF A MULTILAYER ASSEMBLY

Carbon steel substrates (15×4×0.5 cm panels) were treated by grit blasting using aluminium oxide (10 mesh).

A primer composition (C1) was prepared according to the general procedure as detailed above, said primer composition (C1) comprising:
- 16% by weight of the polymer (F-1),
- 17% by weight of a composition comprising the compound (B-1) and the polymer (P-1) in a weight ratio of 12:1,
- 50% by weight of a liquid medium comprising the solvent (S-1) and DMSO in a weight ratio of 1:1, and
- complement to 100% by weight of one or more fillers.

Fillers suitable for use in the primer composition (C1) include DYNAMIX™ BLACK $30C_{965}$ black pigment commercially available from Shepherd Color Company, BYK® 9076 liquid rheology control additive consisting of a solution of a high molecular urea modified medium polar polyamide commercially available from BYK, TECO® Airex 931 deaerator/defoaming agent for solvent-based coating systems based on a fluorinated silicone commercially available from Evonik Tego Chemie GmbH, TERGITOL™ 15-S-3 secondary alcohol ethoxylate surfactant commercially available from Dow, and NUBIROX® 106 pigment commercially available from Nubiola.

The primer composition (C1) so obtained was applied on the so treated carbon steel substrates by spray coating using a gun with a die of 1.2 mm and air pressure of 2.5 bar.

A mid-coat composition (C2) was prepared by irradiation of the polymer (F-2) according to the general procedure as detailed above thereby providing a functional fluoropolymer comprising 21 mmol/Kg of —COOH end groups and 2.3 mmol/Kg of —COF end groups, said functional fluoropolymer having a melt flow index of 59 g/10 min, as measured according to ASTM D 1238 standard method at 372° C. under a load of 5 Kg.

The mid-coat composition (C2) so obtained was then applied onto the wet primer layer by electrostatic powder coating (45 kV, 15 µA).

A top-coat composition (C3) was then prepared, said composition comprising 90% by weight of polymer (F-1), 5% by weight of mica and 5% by weight of poly(sulfonyl-p-phenylene).

A first layer of the top-coat composition (C3) so obtained was applied onto the mid-coat layer by electrostatic powder coating (45 kV, 15 µA). The multilayer assembly so obtained was heated in an oven at 345° C. for 15 minutes. The thickness of the overall multilayer assembly so obtained was comprised between 50 µm and 100 µm.

A second layer of the top-coat composition (C3) so obtained was applied onto the mid-coat layer by electrostatic powder coating (45 kV, 15 µA). The multilayer assembly so obtained was heated in an oven at 330° C. for 15 minutes. A third layer of the top-coat composition (C3) so obtained was applied onto the mid-coat layer by electrostatic powder coating (45 kV, 15 µA). The multilayer assembly so obtained was heated in an oven at 330° C. for 15 minutes.

The thickness of the overall multilayer assembly so obtained was comprised between 100 µm and 200 µm.

EXAMPLE 2: GENERAL PROCEDURE FOR THE MANUFACTURE OF A MULTILAYER ASSEMBLY

Carbon steel substrates (15×4×0.5 cm panels) were treated by grit blasting using aluminium oxide (10 mesh).

A primer composition (C1) was prepared according to the general procedure as detailed above, said primer composition (C1) comprising:
7.97% by weight of the polymer (F-1),
17.34% by weight of the compound (B-1),
1.49% by weight of the polymer (P-1),
60.24% by weight of a liquid medium comprising the solvent (S-1) and DMSO in a weight ratio of 1:1, and
complement to 100% by weight of one or more fillers.
Fillers suitable for use in the primer composition (C1) include DYNAMIX™ BLACK 30C$_{965}$ black pigment commercially available from Shepherd Color Company, BYK® 9076 liquid rheology control additive consisting of a solution of a high molecular urea modified medium polar polyamide commercially available from BYK, TECO® Airex 931 deaerator/defoaming agent for solvent-based coating systems based on a fluorinated silicone commercially available from Evonik Tego Chemie GmbH, TERGITOL™ 15-S-3 secondary alcohol ethoxylate surfactant commercially available from Dow, and NUBIROX® 106 pigment commercially available from Nubiola.

The primer composition (C1) so obtained was applied on the so treated carbon steel substrates by spray coating using a gun with a die of 1.2 mm and air pressure of 2.5 bar.

A mid-coat composition (C2) was prepared, said composition comprising 30% by weight of the TFE/PMVE/VEFS functional polymer (F) prepared according to the general procedure as detailed above and 70% by weight of polymer (F-1).

The mid-coat composition (C2) so obtained was then applied onto the wet primer layer by electrostatic powder coating (45 kV, 15 µA).

A top-coat composition (C3) was then prepared, said composition comprising 90% by weight of polymer (F-1), 8% by weight of mica and 2% by weight of talc.

A first layer of the top-coat composition (C3) so obtained was applied onto the mid-coat layer by electrostatic powder coating (45 kV, 15 µA). The multilayer assembly so obtained was heated in an oven at 345° C. for 15 minutes. The thickness of the overall multilayer assembly so obtained was comprised between 50 µm and 100 µm.

A second layer of the top-coat composition (C3) so obtained was applied onto the mid-coat layer by electrostatic powder coating (45 kV, 15 µA). The multilayer assembly so obtained was heated in an oven at 330° C. for 15 minutes. A third layer of the top-coat composition (C3) so obtained was applied onto the mid-coat layer by electrostatic powder coating (45 kV, 15 µA). The multilayer assembly so obtained was heated in an oven at 330° C. for 15 minutes.

The thickness of the overall multilayer assembly so obtained was comprised between 100 µm and 200 µm.

COMPARATIVE EXAMPLE 1: MANUFACTURE OF A MULTILAYER ASSEMBLY

The same procedure as detailed under Example 1 was followed but without applying the mid-coat composition (C2) onto the primer composition (C1).

COMPARATIVE EXAMPLE 2: MANUFACTURE OF A MULTILAYER ASSEMBLY

The same procedure as detailed under Example 1 was followed but replacing the mid-coat composition (C2) with a composition consisting of polymer (F-1) and the primer composition (C1) with a composition comprising:
7.97% by weight of the polymer (F-1),
17.34% by weight of the compound (B-1),
1.49% by weight of the polymer (P-1),
60.24% by weight of a liquid medium comprising the solvent (S-1) and DMSO in a weight ratio of 1:1, and
complement to 100% by weight of one or more fillers.
Rapid Gas Decompression Test Adhesion of the top-coat layer to the inner layer of panels of multilayer assemblies was tested according to the Autoclave Test following NACE™ 0185 standard procedure. Samples of test panels were prepared and suspended in a beaker where test fluids were added and then the beaker was placed into an autoclave unit. The unit was secured and gases were metered into the unit using partial pressures. The heat was turned on and the pressure was monitored until full temperature was reached. The panels were in this way suspended in an autoclave containing either of the following three phases:
Test A
(1-A) 75% $CH_4$— 25% $CO_2$,
(2-A) hydrocarbon—toluene/kerosene (50/50), and
(3-A) water containing 5% by weight of NaCl,
according to the following test conditions:
temperature: 180° C.,
pressure: 4000 psi,
duration: 48 hours (timed from achievement of stable conditions),
decompression rate: 180° C., 5000 psi/min, or
Test B
(1-B) 79% $CH_4$— 5% $CO_2$— 16% $H_2S$,
(2-B) hydrocarbon—toluene/kerosene (50/50), and
(3-B) water containing 5% by weight of NaCl,
according to the following test conditions:
temperature: 163° C.,
pressure: 7000 psi,
duration: 24 hours (timed from achievement of stable conditions),
decompression rate: 163° C., 6500 psi/min.

After depressurization, the test panel was removed and examined within one hour for blistering change and adhesion in accordance with NACE™ 0185 standard procedure.

Blister size was rated by comparison with photographic standards in FIGS. 1-4 (in the standard) according to ASTM D 714-02 using the following scale: blister size from 10 to 0 (10 being no blisters). Blister size #8 represents blisters whose diameters are so small that they are barely visible with the unaided eye. Blister sizes #6, #4, and #2 represent increasingly larger blister sizes. Blister size #2, e.g. has blisters measuring 4 to 5 mm in diameter. Blister sizes #1 and #0 have increasingly larger blister sizes. These details on blister sizes are given to enable the visualization of these sizes without resorting to the photographic standards, but are not intended as a substitute for reliance on the photographic standards for the actual rating of blister size. Blister frequency is D (dense), Medium Dense (MD), Medium (M) and Few (F). A blister frequency of None means that no blisters (blister size of #10) are visible when viewed with the unaided eye.

Adhesion was evaluated by the Knife Adhesion Test wherein the top-coat layer was scribed using a knife thereby providing 30° "V"-cut scribes. This scribing was done on the panels after being subjected to the Autoclave Test conditions at each of the three phases levels according to Test A or Test B. A knife blade was then inserted into one of the scribes in an attempt to lift the top-coat layer from the surface of the panel.

The adhesion of the top-coat layer in the multilayer assembly is rated as follows:
A—no change,
B—slight loss of adhesion—some resistance to lifting; coating not peeled back to full extent of "V"-cut scribes,
C—moderate loss of adhesion—coating lifted with slight resistance but peeled back to end of "V"-cut scribes,
D—severe loss of adhesion—coating readily lifted with little resistance,
E—disbondment—delamination; coating lifted when cut.

The results are summarized in Table 1 here below.

TABLE 1

| Run | Blisters | Adhesion [phase (1)] | Adhesion [phase (2)] | Adhesion [phase (3)] |
|---|---|---|---|---|
| Ex. 1 | #10 (Test A) | A (Test A) | A (Test A) | A (Test A) |
| Ex. 2 | #10 (Test B) | A (Test B) | A (Test B) | A (Test B) |
| C. Ex. 1 | #0 (Test A) | E (Test A) | E (Test A) | E (Test A) |
| C. Ex. 2 | #10 (Test A) | C (Test A) | E (Test A) | E (Test A) |

It has been thus found that multilayer assembly of the invention as notably represented by the multilayer assembly of any of Examples 1 and 2 according to the invention successfully exhibits outstanding interlayer adhesion properties as compared with the multilayer assembly of any of Comparative Examples 1 and 2 while maintaining good anti-corrosion and good thermal insulation properties to be suitably used in oil and gas applications without undergoing decompression under the effect of pressure impacts.

The invention claimed is:

1. A multilayer assembly comprising:
   a metal substrate, said metal substrate having an inner surface and an outer surface,
   a layer (L1) consisting of a composition (C1) comprising at least one polymer (F), wherein polymer (F) is a fluoropolymer, at least one benzoxazine compound (B) and at least one aromatic polymer (P),
   said layer (L1) having a first surface and a second surface, wherein the first surface of layer (L1) is at least partially adhered to at least one of the inner surfaces and the outer surface of said metal substrate,
   a layer (L2) consisting of a composition (C2) comprising at least one functional polymer (F), wherein functional polymer (F) is a functional fluoropolymer comprising:
      predominantly recurring units of tetrafluoroethylene (TFE) 0.5 to 30% by weight of at least one per(halo)fluoromonomer (PFM) different from TFE; and
      one or more polar functional groups selected from the group consisting of carboxylic groups in acid, acid halide or salt form, sulfonic groups in acid, acid halide or salt form, epoxide groups, silyl groups, alkoxysilane groups, hydroxyl groups and isocyanate groups,
   said layer (L2) having a first surface and a second surface, wherein the first surface of layer (L2) is at least partially adhered to the second surface of said layer (L1), and
   a layer (L3) consisting of a composition (C3) comprising at least one polymer (F), wherein polymer (F) is a fluoropolymer, onto layer (L2).

2. The multilayer assembly according to claim 1, wherein the PFM is at least one per(halo)fluoroalkylvinylether.

3. The multilayer assembly according to claim 1, wherein the compound (B) of composition (C1) is of formula (I):

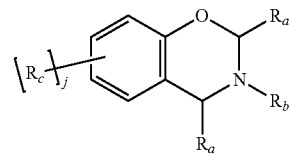

wherein each of $R_a$, equal or different at each occurrence, is H or a $C_1$-$C_{12}$ alkyl group; $R_b$ is a $C_1$-$C_{36}$ hydrocarbon group, optionally comprising one or more heteroatoms, optionally comprising at least one benzoxazine group; j is zero or an integer of 1 to 4; and each of RC, equal or different at each occurrence, is a halogen atom or a $C_1$-$C_{36}$ hydrocarbon group, optionally comprising one or more heteroatoms, optionally comprising at least one benzoxazine group.

4. The multilayer assembly according to claim 1, wherein functional polymer (F) of composition (C2) is manufactured by irradiation of at least one polymer (F) using either a photon source or an electron source.

5. The multilayer assembly according to claim 1, wherein functional polymer (F) of composition (C2) is manufactured by polymerization of at least one fluorinated monomer with at least one functional fluoro-alkylvinylether of formula $CF_2$=$CFOY_0$, wherein $Y_0$ is a $C_1$-$C_{12}$ alkyl or (per)fluoroalkyl group, or a $C_1$-$C_{12}$ oxyalkyl or a $C_1$-$C_{12}$ (per)fluorooxyalkyl group, said $Y_0$ group comprising a carboxylic group in its acid, acid halide or salt form or a sulfonic group in its acid, acid halide or salt form.

6. The multilayer assembly according to claim 1, wherein functional polymer (F) of composition (C2) comprises one or more polar functional groups selected from the group consisting of carboxylic groups in acid, acid halide or salt form and sulfonic groups in acid, acid halide or salt form.

7. The multilayer assembly according to claim 3, wherein polymer (F) of composition (C1) is a TFE copolymer comprising at least 4% by weight of recurring units derived from at least one per(halo)fluoromonomer (PFM).

8. The multilayer assembly according to claim 4, wherein polymer (F) of composition (C1) is a TFE copolymer comprising at most 20% by weight of recurring units derived from at least one per (halo)fluoromonomer (PFM).

9. The multilayer assembly according to claim 1, wherein polymer (P) of composition (C1) is selected from the group consisting of aromatic polyimide polymers (PI).

10. The multilayer assembly according to claim 9, wherein the polymer (PI) is an aromatic polyamide-imide polymer (PAI).

11. The multilayer assembly according to claim 1, wherein in said layer (L3), said polymer (F) of the composition (C3) is selected from the group consisting of copolymers of tetrafluoroethylene (TFE) with at least one per (halo) fluoromonomer (PFM) different from TFE, said layer (L3) having a first surface and a second surface, wherein the first surface of layer (L3) is at least partially adhered to the second surface of layer (L2).

12. The multilayer assembly according to claim 11, wherein composition (C3) further comprises at least one filler.

13. The multilayer assembly according to claim 12, wherein the filler is selected from the group consisting of inorganic and organic fillers.

* * * * *